(12) United States Patent
Ijichi

(10) Patent No.: US 8,660,990 B2
(45) Date of Patent: *Feb. 25, 2014

(54) CONTENT REPRODUCTION SYSTEM, CONTENT PROVIDING METHOD, CONTENT REPRODUCTION APPARATUS, CONTENT PROVIDING APPARATUS, CONTENT REPRODUCTION PROGRAM AND CONTENT PROVIDING PROGRAM

(75) Inventor: Susumu Ijichi, Kanagawa (JP)

(73) Assignee: Sony Corporation, Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 12/841,753

(22) Filed: Jul. 22, 2010

(65) Prior Publication Data

US 2010/0287259 A1 Nov. 11, 2010

Related U.S. Application Data

(63) Continuation of application No. 11/477,434, filed on Jun. 30, 2006.

(30) Foreign Application Priority Data

Jul. 5, 2005 (JP) ................................ 2005-196364

(51) Int. Cl.
*G06F 7/00* (2006.01)
*G06F 17/00* (2006.01)

(52) U.S. Cl.
USPC ............ 707/634; 707/620; 707/622; 707/630

(58) Field of Classification Search
USPC .................. 707/620, 622, 630, 634
See application file for complete search history.

(56) References Cited

U.S. PATENT DOCUMENTS

| | | | | |
|---|---|---|---|---|
| 6,034,314 A | * | 3/2000 | Koike | 84/600 |
| 6,949,704 B2 | * | 9/2005 | Funaki | 84/609 |
| 7,190,646 B1 | * | 3/2007 | Yamauchi | 369/47.12 |
| 7,227,071 B2 | * | 6/2007 | Tagawa et al. | 84/601 |

(Continued)

FOREIGN PATENT DOCUMENTS

| | | |
|---|---|---|
| JP | 2001-93226 A | 4/2001 |
| JP | 2003-50588 A | 2/2003 |

(Continued)

OTHER PUBLICATIONS

Japanese Office Action issued on Jul. 29, 2010 in corresponding Japanese Application No. 2005-196364.

(Continued)

*Primary Examiner* — Etienne Leroux
*Assistant Examiner* — Jared Bibbee
(74) *Attorney, Agent, or Firm* — Oblon, Spivak, McClelland, Maier & Neustadt, L.L.P.

(57) ABSTRACT

A content reproduction apparatus includes a communication unit that communicates with a content-providing apparatus. The content reproduction apparatus also includes a reproducing unit that reproduces content data. Further, the content reproduction apparatus includes a controller that transmits a request to the content-providing apparatus. The request indicates whether a data streaming reproduction service is available. The controller receives and reproduces a first one of an order of content data which is ordered by the content-providing apparatus based on the request. The controller also receives, after a determination that a second one of the order of content data exists, an attribute of the second one of the order of content data.

41 Claims, 25 Drawing Sheets

(56) References Cited

U.S. PATENT DOCUMENTS

| | | |
|---|---|---|
| 7,268,288 B2* | 9/2007 | Yamane et al. ............... 84/615 |
| 2002/0035519 A1* | 3/2002 | Takizawa ........................ 705/26 |
| 2003/0000369 A1* | 1/2003 | Funaki ............................ 84/609 |
| 2003/0018799 A1* | 1/2003 | Eyal ............................. 709/231 |
| 2003/0028539 A1* | 2/2003 | Nunome et al. ............... 707/10 |
| 2003/0211830 A1* | 11/2003 | Takimoto et al. ........... 455/41.2 |
| 2004/0003706 A1* | 1/2004 | Tagawa et al. ................. 84/609 |
| 2004/0078383 A1* | 4/2004 | Mercer et al. ................ 707/102 |
| 2004/0167890 A1* | 8/2004 | Eyal ................................. 707/3 |
| 2004/0255761 A1* | 12/2004 | Yamane et al. ................. 84/615 |
| 2005/0108413 A1 | 5/2005 | Melmon |
| 2006/0143236 A1* | 6/2006 | Wu ............................. 707/104.1 |
| 2007/0140080 A1* | 6/2007 | Yamauchi ................. 369/47.15 |
| 2007/0168865 A1* | 7/2007 | Tsutsumi et al. ............. 715/716 |
| 2008/0019240 A1 | 1/2008 | Araki ............................. 84/609 |
| 2008/0074985 A1 | 3/2008 | Mukaiyama et al. ......... 707/769 |
| 2008/0162573 A1* | 7/2008 | Eyal .......................... 707/104.1 |
| 2008/0184142 A1 | 7/2008 | Ijichi et al. ................... 715/716 |
| 2011/0213769 A1* | 9/2011 | Handman et al. ............ 707/722 |

FOREIGN PATENT DOCUMENTS

| | | |
|---|---|---|
| JP | 2004-53826 A | 2/2004 |
| JP | 2004-212754 A | 7/2004 |
| JP | 2005-122075 A | 5/2005 |
| JP | 2005-176262 A | 6/2005 |
| JP | 2007-516518 A | 6/2007 |
| WO | WO 2005/043798 A2 | 5/2005 |
| WO | WO 2005/043798 A3 | 5/2005 |

OTHER PUBLICATIONS

Japanese Office Action issued on Mar. 17, 2011 in corresponding Japanese Application No. 2005-196364.

* cited by examiner

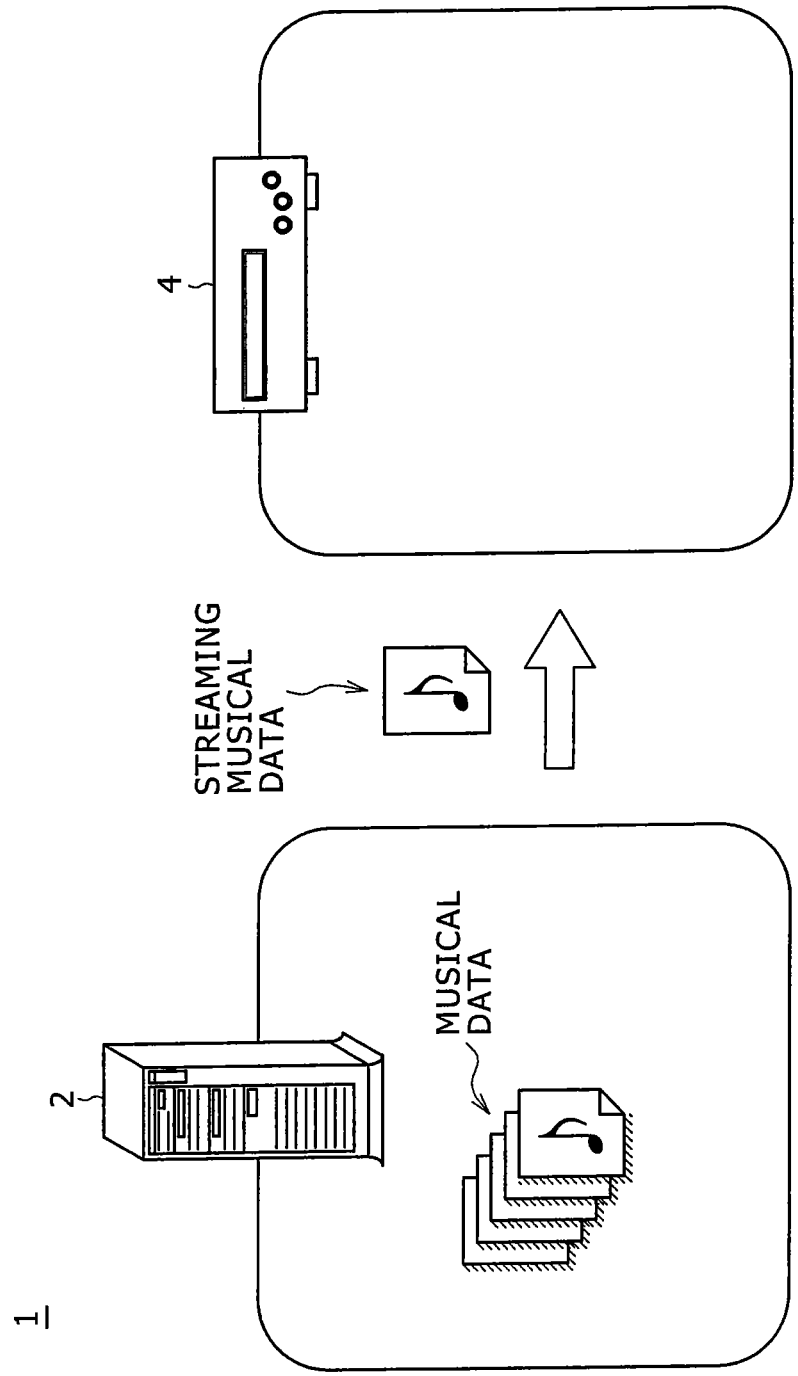

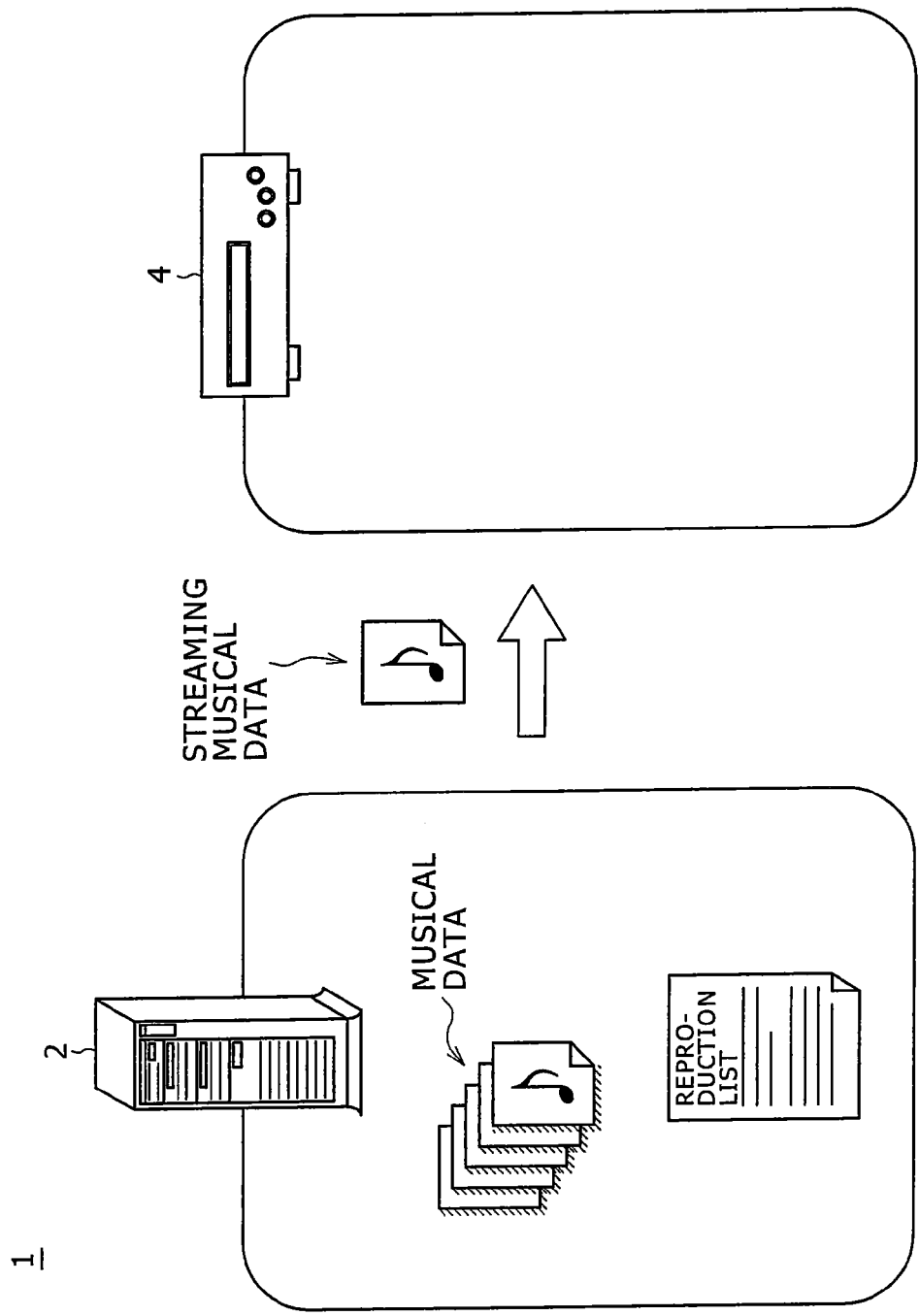

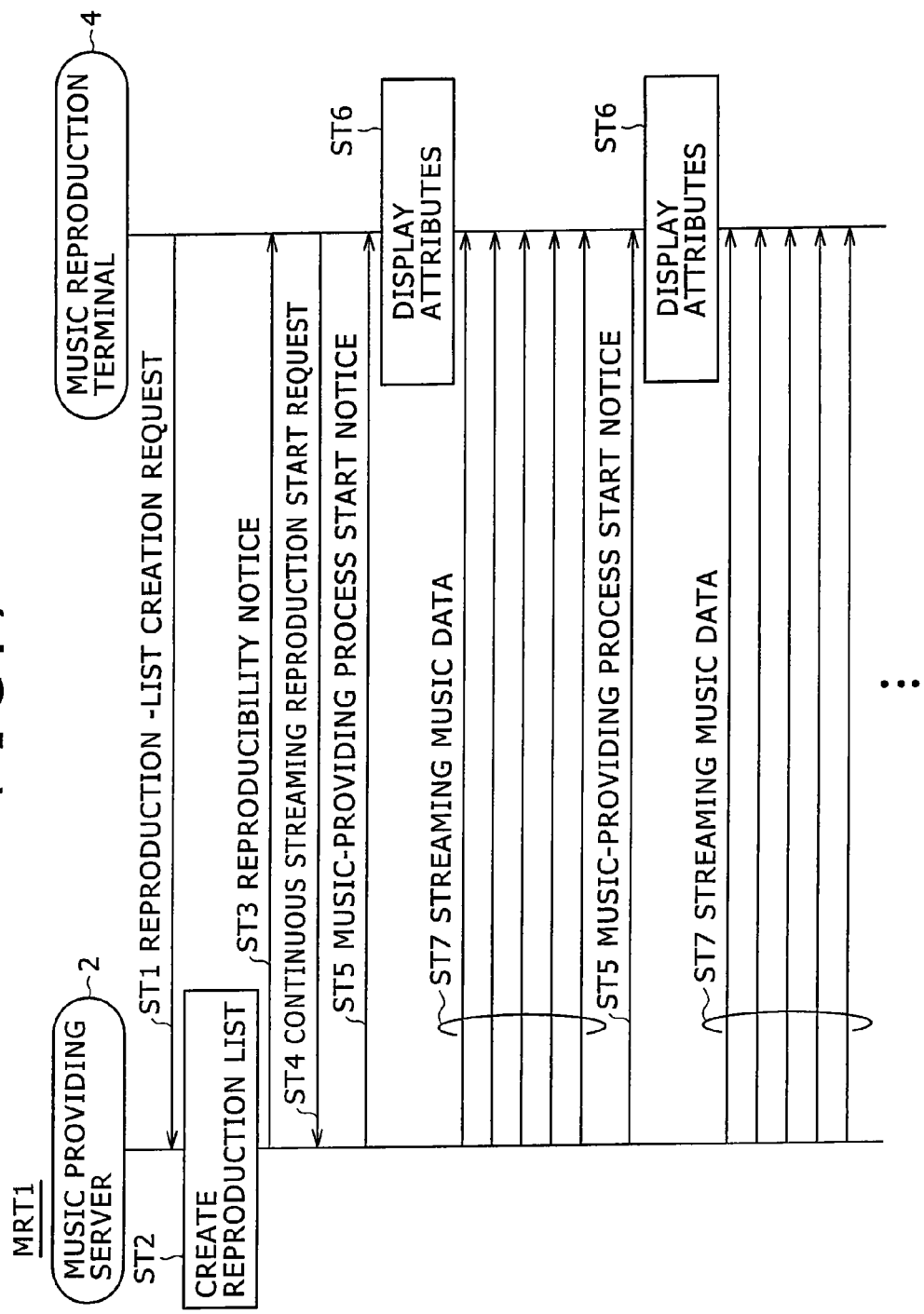

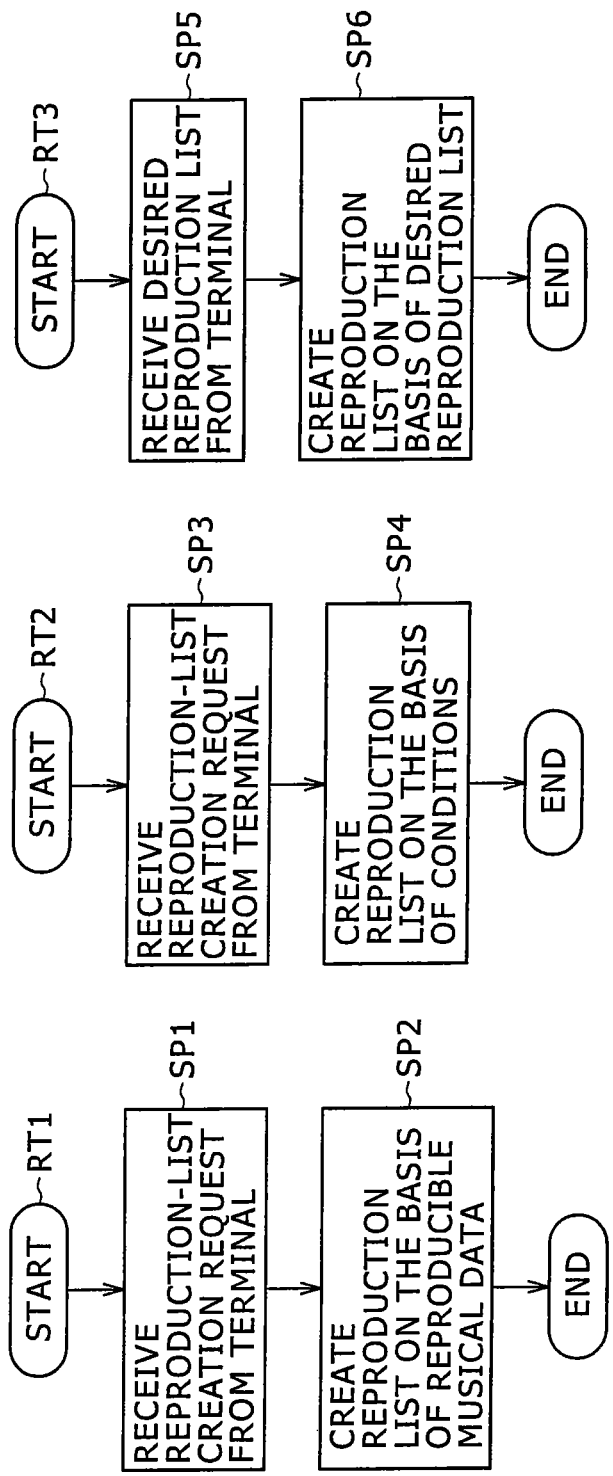

FIG. 9A

| TERMINAL ID | | |
|---|---|---|
| ID | MUSICAL-DATA ID | STORAGE LOCATION |
| ID | MUSICAL-DATA ID | STORAGE LOCATION |
| ID | MUSICAL-DATA ID | STORAGE LOCATION |
| ID | MUSICAL-DATA ID | STORAGE LOCATION |
| ID | MUSICAL-DATA ID | STORAGE LOCATION |

↙ L1

※REPRODUCTION LIST SHOWING INFORMATION FOR 5 SONGS

FIG. 9B

| INSTRUCTION(SUCH AS MUSIC-PROVIDING START REQUEST AND MUSIC-PROVIDING STOP REQUEST) | MUSICAL-DATA ID | TERMINAL ID |
|---|---|---|

| CD MEDIA INFORMATION | TOTAL SONGS |
|---|---|
| ID MUSICAL-DATA ID | STORAGE LOCATION |
| ID MUSICAL-DATA ID | STORAGE LOCATION |
| ID MUSICAL-DATA ID | STORAGE LOCATION |
| ID MUSICAL-DATA ID | STORAGE LOCATION |

| MEMORY MEDIA INFORMATION | TOTAL SONGS |
|---|---|
| ID MUSICAL-DATA ID | STORAGE LOCATION |
| ID MUSICAL-DATA ID | STORAGE LOCATION |
| ID MUSICAL-DATA ID | STORAGE LOCATION |
| ID MUSICAL-DATA ID | STORAGE LOCATION |

| MD MEDIA INFORMATION | TOTAL SONGS |
|---|---|
| ID MUSICAL-DATA ID | STORAGE LOCATION |
| ID MUSICAL-DATA ID | STORAGE LOCATION |
| ID MUSICAL-DATA ID | STORAGE LOCATION |
| ID MUSICAL-DATA ID | STORAGE LOCATION |

| HDD MEDIA INFORMATION | TOTAL SONGS |
|---|---|
| ID MUSICAL-DATA ID | STORAGE LOCATION |
| ID MUSICAL-DATA ID | STORAGE LOCATION |
| ID MUSICAL-DATA ID | STORAGE LOCATION |
| ID MUSICAL-DATA ID | STORAGE LOCATION |

CONTENT REPRODUCTION SYSTEM, CONTENT PROVIDING METHOD, CONTENT REPRODUCTION APPARATUS, CONTENT PROVIDING APPARATUS, CONTENT REPRODUCTION PROGRAM AND CONTENT PROVIDING PROGRAM

CROSS REFERENCES TO RELATED APPLICATIONS

This application is a continuation of and claims the benefit of priority under 35 U.S.C. §120 from U.S. Ser. No. 11/477,434, filed Jun. 30, 2006, and claims the benefit of priority under 35 U.S.C. §119 from Japanese Patent Application JP 2005-196364, filed in the Japanese Patent Office on Jul. 5, 2005, the entire contents of both documents being incorporated herein by reference.

BACKGROUND OF THE INVENTION

1. Field of the Invention

The present invention relates to a content reproduction system, a content providing method, a content reproduction apparatus, a content providing-apparatus, a content reproduction program and a content providing program. For example, the present invention is applied suitably to a music reproduction system including a music providing server for providing musical data and a music reproduction terminal for acquiring musical data from the music providing server through a network and, at the same time, sequentially reproducing the acquired musical data in the so-called streaming reproduction process.

2. Description of Related Art

In the conventional music reproduction system, when the user carries out a music-specifying operation on a music reproduction terminal to specify musical data to be reproduced in a streaming reproduction process, the music reproduction terminal requests the music providing server to provide the musical data specified in the music-specifying operation.

In this case, the music providing server provides the requested musical data to the music reproduction terminal as musical data to be reproduced in a streaming reproduction process. Then, the music reproduction terminal reproduces the acquired musical data in a streaming reproduction process. For more information on the conventional music reproduction system, refer to Japanese Patent Laid-open No. 2004-4245.

SUMMARY OF THE INVENTION

By the way, in the music reproduction system having the configuration described above, musical data specified in a music-specifying operation carried out by the user is reproduced in the music reproduction terminal operated by the user in a streaming reproduction process. Thus, if there is a plurality of pieces of musical data to be reproduced in a streaming reproduction process, the user must carry out a plurality of music-specifying operations to specify the pieces of musical data one after another. As a result, the music reproduction system raises a problem that the user is hardly capable of reproducing the pieces of musical data in a streaming reproduction process with a high degree of efficiency.

Addressing the problem described above, inventors of the present invention have proposed a content reproduction system capable of reproducing contents with a substantially high degree of efficiency as well as a content providing method, a content reproduction apparatus, a content providing-apparatus, a content reproduction program and a content providing program, which are provided for the content reproduction system.

In order to solve the problem described above, in accordance with an embodiment of the present invention, there is provided a content reproduction system including a content-providing apparatus for providing contents and a content reproduction apparatus for acquiring a content from the content-providing apparatus and, at the same time, sequentially reproducing the acquired content. In the content reproduction system, contents reproducible by the content reproduction apparatus are selected from contents that can be provided by the content-providing apparatus and a reproduction list showing an order or reproduction of the selected contents is created. Then, the selected contents are provided from the content-providing apparatus to the content reproduction apparatus in accordance with the created reproduction list.

As described above, the content-providing apparatus selects contents reproducible by the content reproduction apparatus from contents that can be provided by the content-providing apparatus and creates a reproduction list showing an order or reproduction of the selected contents. Then, the content-providing apparatus provides the selected contents to the content reproduction apparatus in accordance with the created reproduction list. Thus, the content reproduction apparatus is capable of sequentially receiving the contents sequentially provided by the content-producing apparatus and sequentially reproducing the contents in accordance with the reproduction list.

In accordance with the present invention, the content reproduction apparatus is capable of sequentially receiving contents sequentially provided by the content-producing apparatus and sequentially reproducing the contents in accordance with a reproduction list. Thus, the content reproduction apparatus is capable of reproducing contents with a substantially high degree of efficiency without the need for the user to spend long time and much labor.

BRIEF DESCRIPTION OF THE DRAWINGS

These and other objects and features of the present invention will become clear from the following description of the preferred embodiments given with reference to the accompanying diagrams, in which:

FIG. 4 is an explanatory rough diagram referred to in description of a streaming reproduction process;

FIG. 5 is an explanatory rough diagram showing a music reproduction system in which a music providing server holds a reproduction list;

FIG. 7 shows a flowchart of a continuous streaming reproduction processing procedure;

FIGS. 8A to 8C show flowcharts of reproduction-list creation processing procedures;

FIGS. 9A and 9B are rough diagrams showing respectively a reproduction list and information exchanged between the music providing server and the music reproduction terminal;

FIGS. 21A to 21D are explanatory rough diagrams showing management information;

DETAILED DESCRIPTION OF THE PREFERRED EMBODIMENTS

Embodiments of the present invention are explained in detail by referring to diagrams as follows.

(1) Overview

An overview of first to fourth embodiments is explained below by referring to FIGS. 1 and 2. By the way, after the overview is explained, the first to fourth embodiments are explained concretely.

Figure 1:
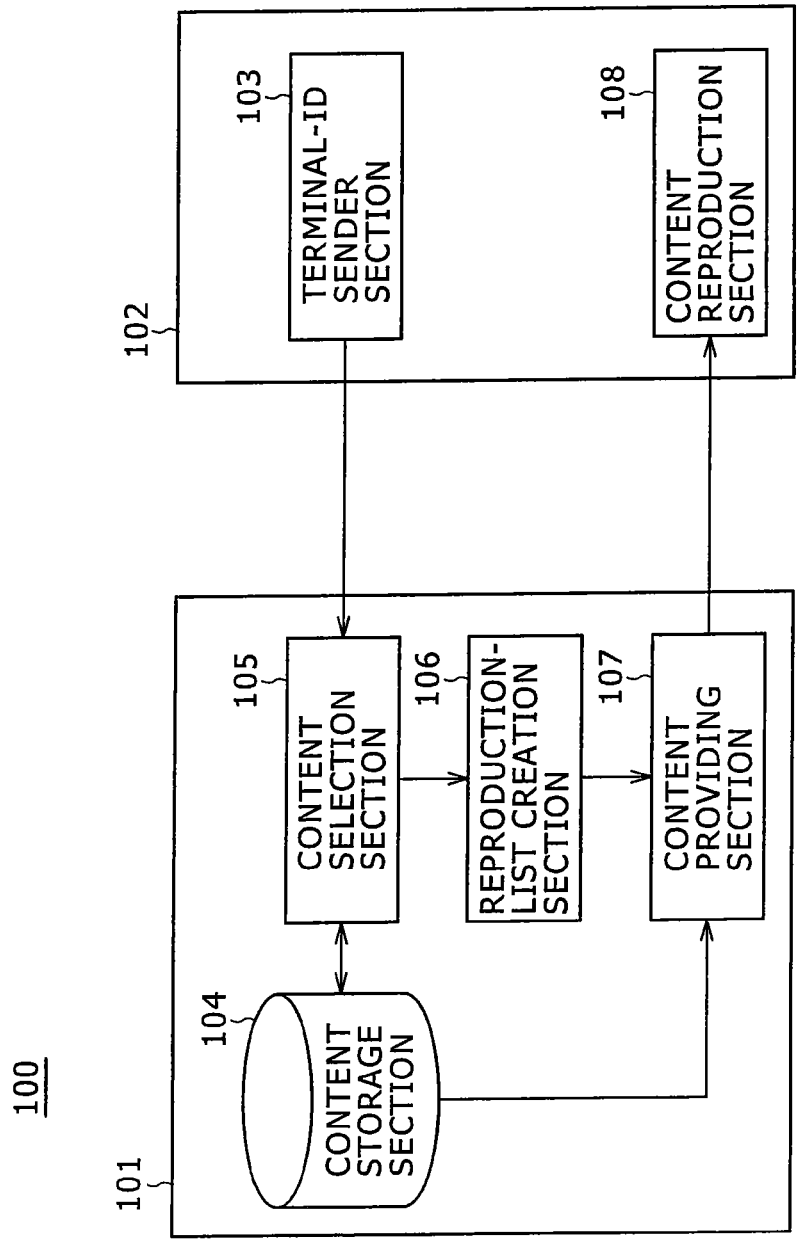
FIG. 1 is a rough diagram showing an outline of a content reproduction system.

A content reproduction system 100 shown in FIG. 1 includes a content-providing apparatus 101 and a content reproduction apparatus 102. The content-providing apparatus 101 is an apparatus for providing contents. On the other hand, the content reproduction apparatus 102 is an apparatus receiving contents provided by the content-providing apparatus 101 and, at the same time, sequentially reproducing the contents received from the content-providing apparatus 101. The content-providing apparatus 101 selects specific contents that can be reproduced by the content reproduction apparatus 102 from contents stored in the content-providing apparatus 101 and creates a reproduction list showing an order of reproduction of the selected contents. Then, the content-providing apparatus 101 provides the selected contents to the content reproduction apparatus 102 in accordance with the reproduction list.

To put it concretely, the content reproduction apparatus 102 includes a terminal-ID sender section 103 and a content reproduction section 108. The terminal-ID sender section 103 is a unit for transmitting an apparatus ID used for identifying the content reproduction apparatus 102 to the content-providing apparatus 101. The content reproduction section 108 is a unit for reproducing a content received from the content-providing apparatus 101. On the other hand, the content-providing apparatus 101 includes a content storage section 104, a content selection section 105, a reproduction-list creation section 106 and a content providing section 107. The content storage section 104 is a memory used for storing contents that can be provided to the content reproduction apparatus 102. The content selection section 105 is a unit for selecting specific contents from the contents stored in the content storage section 104. The specific contents selected by the content selection section 105 are contents that can be reproduced by the content reproduction apparatus 102 identified by an apparatus ID received from the terminal-ID sender section 103. The reproduction-list creation section 106 is a unit for creating a reproduction list showing an order of reproduction of the contents selected by the content selection section 105. The content providing section 107 is a unit for providing the content reproduction section 108 with contents in accordance with the reproduction list created by the reproduction-list creation section 106. Thus, the content reproduction section 108 is capable of sequentially reproducing contents provided sequentially by the content reproduction apparatus 102.

Figure 2:
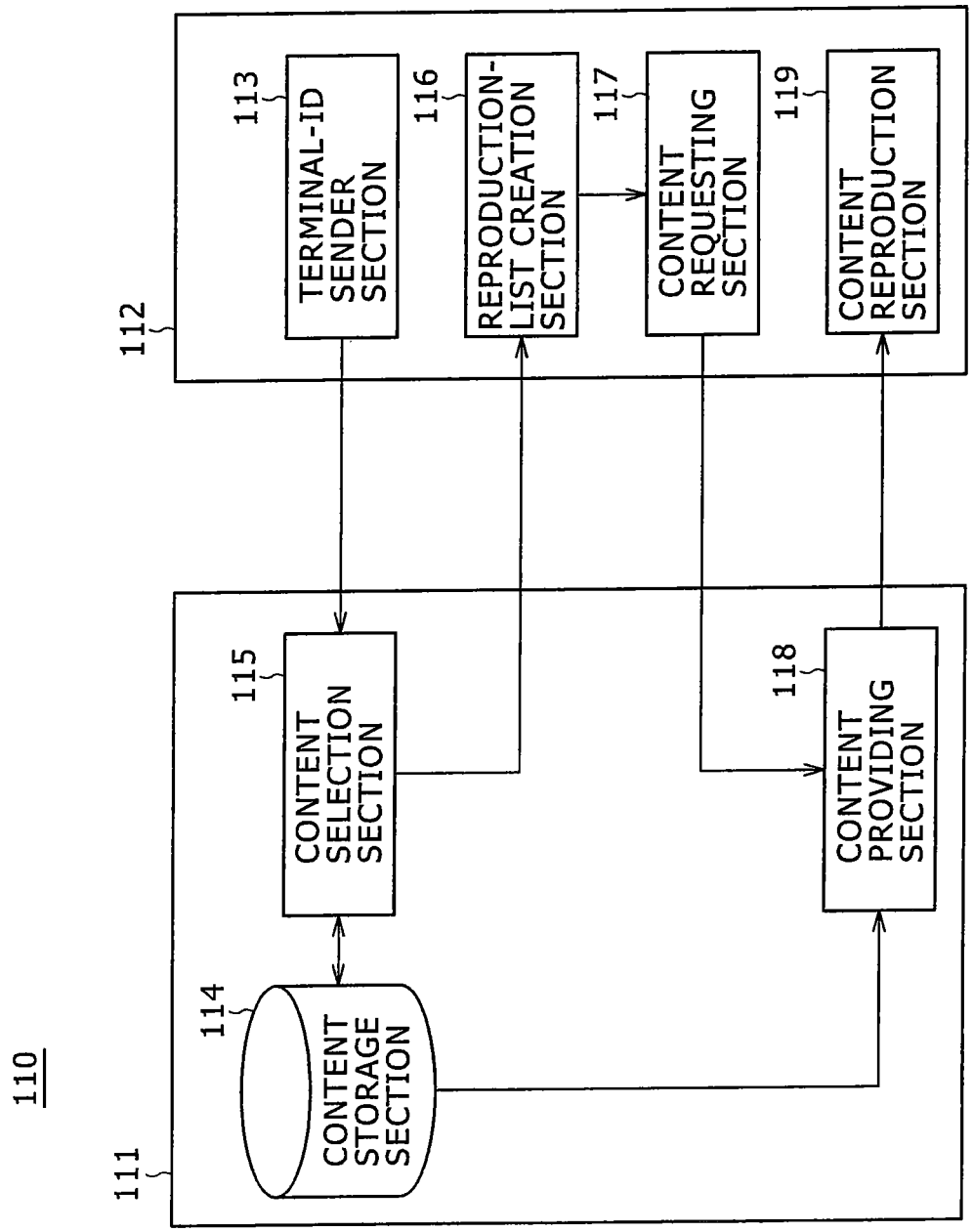
FIG. 2 is another rough diagram showing an outline of a content reproduction system.

On the other hand, the content reproduction system 110 shown in FIG. 2 includes a content-providing apparatus 111 and a content reproduction apparatus 112. The content-providing apparatus 111 is an apparatus for providing contents. On the other hand, the content reproduction apparatus 112 is an apparatus receiving contents provided by the content-providing apparatus 111 and, at the same time, sequentially reproducing the contents received from the content-providing apparatus 111. The content-providing apparatus 111 selects specific contents that can be reproduced by the content reproduction apparatus 112 from contents stored in the content-providing apparatus 111. The content reproduction apparatus 112 creates a reproduction list showing an order of reproduction of the selected contents. Then, the content-providing apparatus 111 provides the selected contents to the content reproduction apparatus 112 in accordance with the reproduction list created by the content reproduction apparatus 112.

To put it concretely, the content-providing apparatus 111 has a content storage section 114, a content selection section 115 and content providing section 118. The content storage section 114 is a memory used for storing contents that can be provided to the content reproduction apparatus 112. The content selection section 115 is a unit for selecting specific contents from the contents stored in the content storage section 114. The specific contents selected by the content selection section 105 are contents that can be reproduced by the content reproduction apparatus 112 identified by an apparatus ID received from the content reproduction apparatus 112. The content providing section 118 is a unit for providing the content reproduction section 119 with contents requested by the content reproduction apparatus 112. On the other hand, the content reproduction apparatus 112 has a terminal-ID sender section 113, a reproduction-list creation section 116, a content requesting section 117 and a content reproduction section 119. The terminal-ID sender section 113 is a unit for transmitting an apparatus ID used for identifying the content reproduction apparatus 112 to the content-providing apparatus 111. The reproduction-list creation section 116 is a unit for creating a reproduction list showing an order of reproduction of the contents selected by the content selection section 115. The content requesting section 117 is a unit for requesting the content-providing apparatus 111 to sequentially transmitting contents in accordance with a reproduction list created by the reproduction-list creation section 116. The content reproduction section 119 is a unit for receiving contents provided sequentially by the content providing section 118 employed in content-providing apparatus 111 as requested by the content requesting section 117 and, at the same time, reproducing the contents received from the content providing section 118.

(2) First Embodiment

Figure 3:
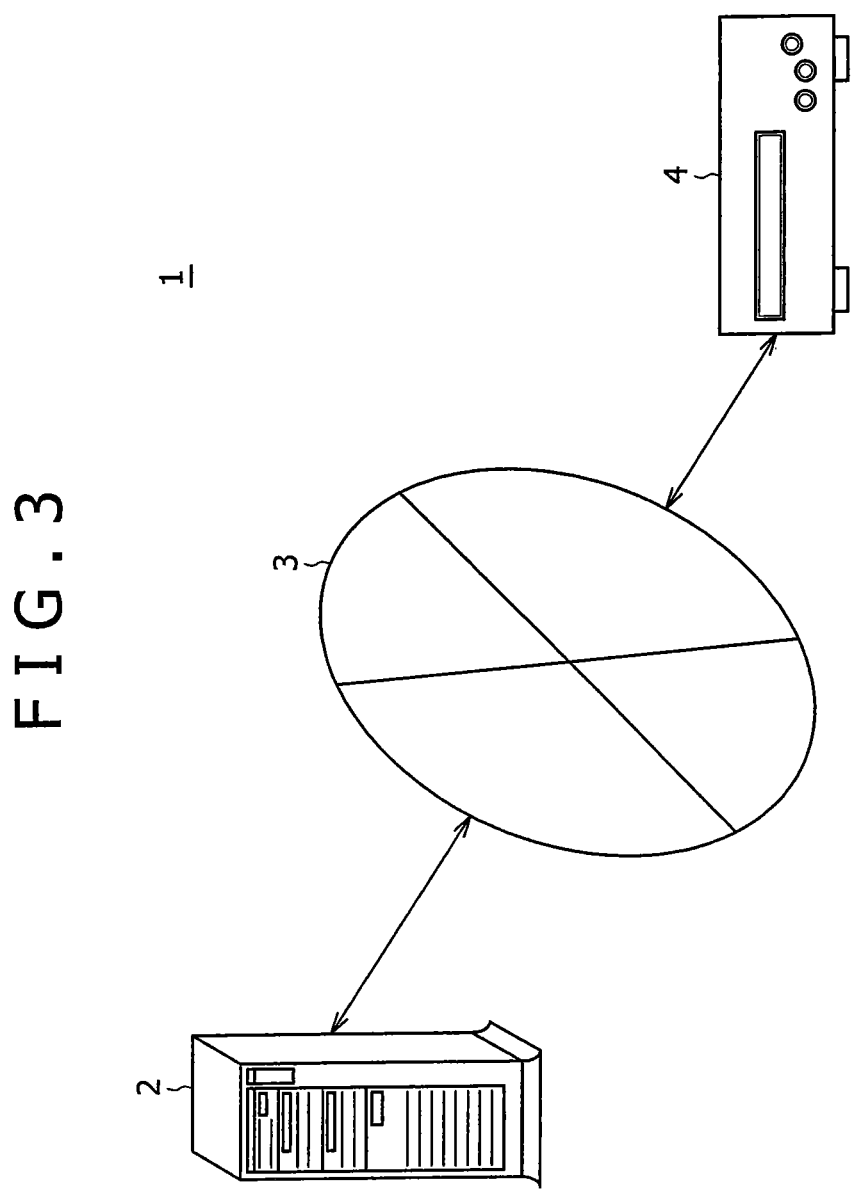
FIG. 3 is a rough diagram showing the configuration of a music reproduction system.

In FIG. 3, reference numeral 1 denotes the whole of a music reproduction system, which includes a music providing server 2, a network 3 and a music reproduction terminal 4. The music providing server 2 is an apparatus for providing musical data to the music reproduction terminal 4 by way of the network 3. The music reproduction terminal 4 is an apparatus for receiving musical data from the music providing server 2 and, at the same time, sequentially reproducing the received musical data in a streaming reproduction process.

A typical streaming reproduction process is explained by referring to a conceptual diagram of FIG. 4 as follows. The music providing server 2 selects pieces of musical data requested by the music reproduction terminal 4 among a plurality of pieces of musical data that can be provided to the network 3 and provides the selected pieces of musical data to the music reproduction terminal 4 as streaming musical data to be reproduced in a streaming reproduction process. At that time, the music reproduction terminal 4 sequentially receives the musical data provided by the music providing server 2 as streaming musical data and sequentially reproduces the received musical data. Then, the music reproduction terminal 4 deletes musical data after the end of the reproduction process.

In the case of the first embodiment, as shown in FIG. 5, the music providing server 2 holds a reproduction list as information on a music reproduction order, which is an order of reproduction of streaming musical data, and sequentially provides the streaming musical data to the music reproduction terminal 4 in an order shown by the reproduction list. The music reproduction terminal 4 sequentially receives the streaming musical data provided sequentially by the music reproduction terminal 4 and sequentially reproduces the data. Thus, in accordance with the music reproduction system 1, the music reproduction terminal 4 is capable of reproducing a plurality of pieces of musical data in accordance with a reproduction list held by the music providing server 2 in a streaming reproduction process. This scheme is explained in more detail as follows.

Figure 6A:
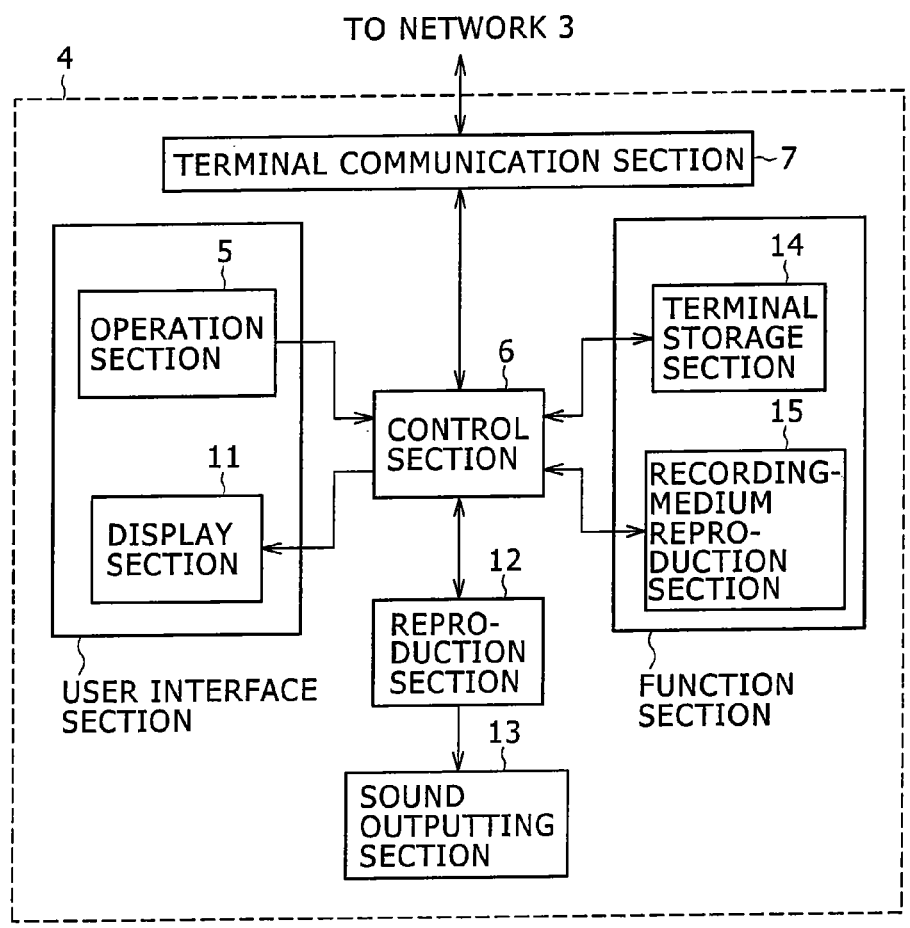
FIGS. 6A and 6B are rough diagrams showing the configurations of a music reproduction terminal and the music providing server, respectively.

When a continuous streaming data reproduction operation is carried out on a operation section 5 employed in the music reproduction terminal 4 shown in FIG. 6A to make a request for a continuous streaming reproduction process to reproduce a plurality of pieces of musical data, a control section 6 employed in the music reproduction terminal 4 as a controller for controlling the entire music reproduction terminal 4 in an integrated manner transmits a reproduction-list creation request signal to the music providing server 2 by way of a transmission route including a terminal communication section 7 employed in the music reproduction terminal 4 and the network 3 following the terminal communication section 7 at step ST1 of a procedure shown in FIG. 7. The reproduction-list creation request signal is a signal making a request for creation of a reproduction list to be used in a continuous streaming reproduction process. The reproduction-list creation request signal includes a terminal ID for identifying the music reproduction terminal 4.

In some cases, the reproduction-list creation request signal according to this embodiment may include a reproduction-list creation condition showing a requirement for creation of a reproduction list. For example, the reproduction-list creation condition typically includes musical-data specification information specifying pieces of musical data to be put on the reproduction list, musical-data type specification information specifying the types of pieces of musical data to be put on the reproduction list and reproduction-order specification information specifying an order of reproduction of the specified pieces of musical data. The types of musical data may be the name of an artist associated with the musical data, the genre of the musical data and a condition requiring that the musical data shall be data included in the top ten of sales. An example of the reproduction-order specification information is an order of release dates starting with the latest date. In addition, the reproduction-list creation request signal according to this embodiment may include a desired reproduction list created in advance by the user. The desired reproduction list created in advance by the user shows an order desired by the user as an order of reproduction of the pieces of streaming musical data requested by the user.

Figure 6B:
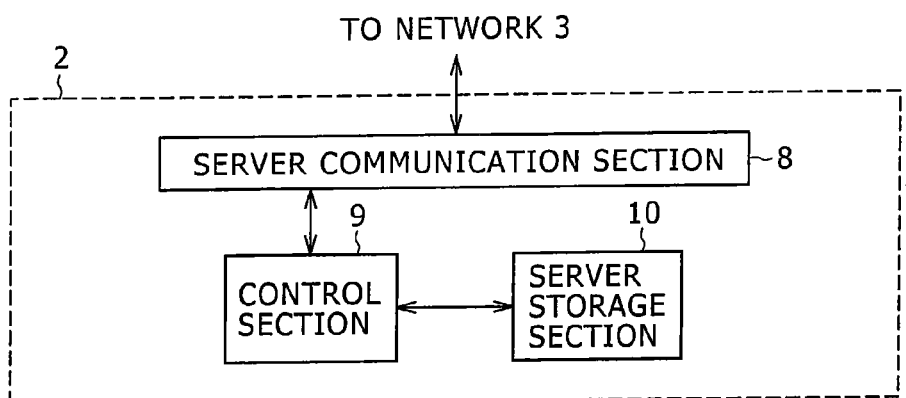

When a server communication section 8 employed in the music providing server 2 shown in FIG. 6B receives a reproduction-list creation request signal transmitted by the music reproduction terminal 4, a control section 9 employed in the music providing server 2 as a section for controlling the entire music providing server 2 in an integrated manner carries out a reproduction-list creation process at step ST2 of the procedure shown in FIG. 7.

The reproduction-list creation processing is explained concretely by referring to flowcharts shown in FIG. 8. In the case of the reproduction-list generation processing procedure RT1 shown in FIG. 8A, for example, at the first step SP1, the control section 9 employed in the music providing server 2 receives a reproduction-list generation request signal including a terminal ID from the music reproduction terminal 4. Then, the flow of the procedure goes on to step SP2. At step SP2, the control section 9 carries out a reproducible-music selection process to select pieces of musical data, which can be reproduced by the music reproduction terminal 4 identified by the terminal ID included in the reproduction-list generation request signal in a streaming reproduction process, from a plurality of pieces of musical data stored in a server storage section 10 employed in the music providing server 2. Then, the control section 9 creates a reproduction list L1 like one shown in FIG. 9A by arranging musical-data IDs each used for identifying a piece of musical data selected in the reproducible-music selection process in a reproduction order. Subsequently, the control section 9 stores the created reproduction list L1 in the server storage section 10. At that time, the control section 9 associates the terminal ID of the music reproduction terminal 4 making a request for the generation of the reproduction list L1 with the reproduction list L1. In addition, the control section 9 also associates each of the musical-data IDs included in the reproduction list L1 with information on a storage location at which the piece of musical data identified by the musical-data ID has been stored in the server storage section 10. The information on a storage location typically includes a path on the server storage section 10.

By the way, in the processing to select reproducible musical data in accordance with this embodiment, for example, musical data having a format allowing the musical data to be reproduced by the music reproduction terminal 4 identified by the terminal ID is selected as musical data reproducible in a streaming reproduction process. Examples of the format allowing the musical data to be reproduced by the music reproduction terminal 4 are MP3 and ATRAC. As another example, in the processing to select reproducible musical data, musical data according to a service to which the user of the music reproduction terminal 4 subscribes is selected as musical data reproducible in a streaming reproduction process. In addition, a variety of selection techniques can be adopted in the processing to select reproducible musical data.

In the case of the reproduction-list generation processing procedure RT2 shown in FIG. 8B, at the first step SP3, the control section 9 employed in the music providing server 2 receives a reproduction-list generation request signal including a terminal ID and a condition for creation of a reproduction list from the music reproduction terminal 4. Then, the flow of the procedure goes on to step SP4. At step SP4, the control section 9 carries out a reproducible-music selection process to select pieces of musical data, which can be reproduced by the music reproduction terminal 4 identified by the terminal ID included in the reproduction-list generation request signal in a streaming reproduction process, from a plurality of pieces of musical data stored in a server storage section 10 employed in the music providing server 2. Then, the control section 9 creates a reproduction list L1 by arranging musical-data IDs in a reproduction order satisfying a requirement specified in the condition included in the reproduction-list generation request signal as the condition for creation of a reproduction list. The musical-data IDs put on the reproduction list L1 are each used for identifying a specific piece of musical data extracted from the pieces of musical data selected in the reproducible-music selection process as a specific piece of musical data meeting the condition. Subsequently, the control section 9 stores the created reproduction list L1 in the server storage section 10.

In the case of the reproduction-list generation processing procedure RT3 shown in FIG. 8C, at the first step SP5, the control section 9 employed in the music providing server 2 receives a reproduction-list generation request signal including a terminal ID and a desired reproduction list from the music reproduction terminal 4. Then, the flow of the procedure goes on to step SP6. At step SP6, the control section 9 carries out a reproducible-music selection process to select pieces of musical data, which can be reproduced by the music reproduction terminal 4 identified by the terminal ID included in the reproduction-list generation request signal in a streaming reproduction process, from a plurality of pieces of musical data stored in a server storage section 10 employed in the music providing server 2. Then, the control section 9 creates a reproduction list L1 by arranging musical-data IDs in a reproduction order shown in the desired reproduction list included in the reproduction-list generation request signal. The musical-data IDs put on the reproduction list L1 are each used for identifying a specific piece of musical data extracted from the pieces of musical data selected in the reproducible-music selection process as a specific piece of musical data put on the desired reproduction list. Subsequently, the control section 9 stores the created reproduction list L1 in the server storage section 10.

After the control section 9 employed in the music providing server 2 stores a reproduction list L1 created in the reproduction-list generation processing procedure RT1, RT2 or RT3 in the server storage section 10 as described above, at step ST3 of the procedure shown in FIG. 7, the control section 9 transmits a reproducibility notice signal to the music reproduction terminal 4 by way of a transmission route including the server communication section 8 employed in the music providing server 2 and the network 3 following the server communication section 8 as a signal informing the music reproduction terminal 4 that a continuous streaming reproduction process can be carried out in accordance with the reproduction list L1 stored in the server storage section 10.

When the terminal communication section 7 employed in the music reproduction terminal 4 receives the reproducibility notice signal from the music providing server 2, at step ST4 of the procedure shown in FIG. 7, the control section 6 employed in the music reproduction terminal 4 transmits a continuous streaming reproduction start request signal to the music providing server 2 by way of a transmission route including the terminal communication section 7 employed in the music reproduction terminal 4 and the network 3 following the terminal communication section 7 as a signal requesting the music providing server 2 to start the continuous streaming reproduction process according to the reproduction list L1.

When the server communication section 8 employed in the music providing server 2 receives the continuous streaming reproduction start request signal from the music reproduction terminal 4, at step ST5 of the procedure shown in FIG. 7, the control section 9 employed in the music providing server 2 transmits a music-providing process start notice signal to the music reproduction terminal 4 by way of a transmission route including the server communication section 8 and the network 3 following the server communication section 8 as a signal informing the music reproduction terminal 4 that a process to transmit musical data in accordance with the reproduction list L1 to the music reproduction terminal 4 as streaming musical data has been started. By the way, the music-providing process start notice signal includes attributes of the streaming musical data to be provided first by the music providing server 2. Typically, the attributes include information such as the title of a piece of streaming musical data provided initially to the music reproduction terminal 4 and the name of an artist associated with the initial piece of streaming musical data.

When the terminal communication section 7 employed in the music reproduction terminal 4 receives the music-providing process start notice signal from the music providing server 2, at step ST6 of the procedure shown in FIG. 7, the control section 6 employed in the music reproduction terminal 4 displays information based on the attributes included in the music-providing process start notice signal received from the music providing server 2 on the display section 11 as information on the streaming musical data. The displayed information typically includes the title of the streaming musical data to be reproduced from now on in a streaming reproduction process and the names of artists associated with the streaming musical data.

After transmitting a music-providing process start notice signal to the music reproduction terminal 4, at step ST7 of the procedure shown in FIG. 7, the control section 9 employed in the music providing server 2 refers to the reproduction list L1 to recognize a storage location associated with the first musical-data ID in the reproduction order. Then, the control section 9 reads out musical data from the storage location recognized as a storage location in the server storage section 10 and transmits the musical data read out from the server storage section 10 to the music reproduction terminal 4 by way of a transmission route including the server communication section 8 and the network 3 following the server communication section 8 as streaming musical data.

In this way, the control section 6 employed in the music reproduction terminal 4 is capable of outputting sounds of music from the sound outputting section 13 by controlling the reproduction section 12 to sequentially reproduce the streaming musical data being received by the terminal communication section 7 from the music providing server 2.

Immediately after the control section 9 employed in the music providing server 2 finishes the transmission of the first streaming musical data shown in the reproduction list L1, the control section 9 transmits each of the subsequent pieces of streaming musical data shown in the reproduction list L1 by executing the same procedure as the steps ST5 to ST7 described above.

Next, the continuous streaming reproduction procedure MRT1 shown in FIG. 7 is explained by dividing the procedure into a processing procedure executed by the music providing server 2 and a processing procedure executed by the music reproduction terminal 4 as follows.

Figure 10:
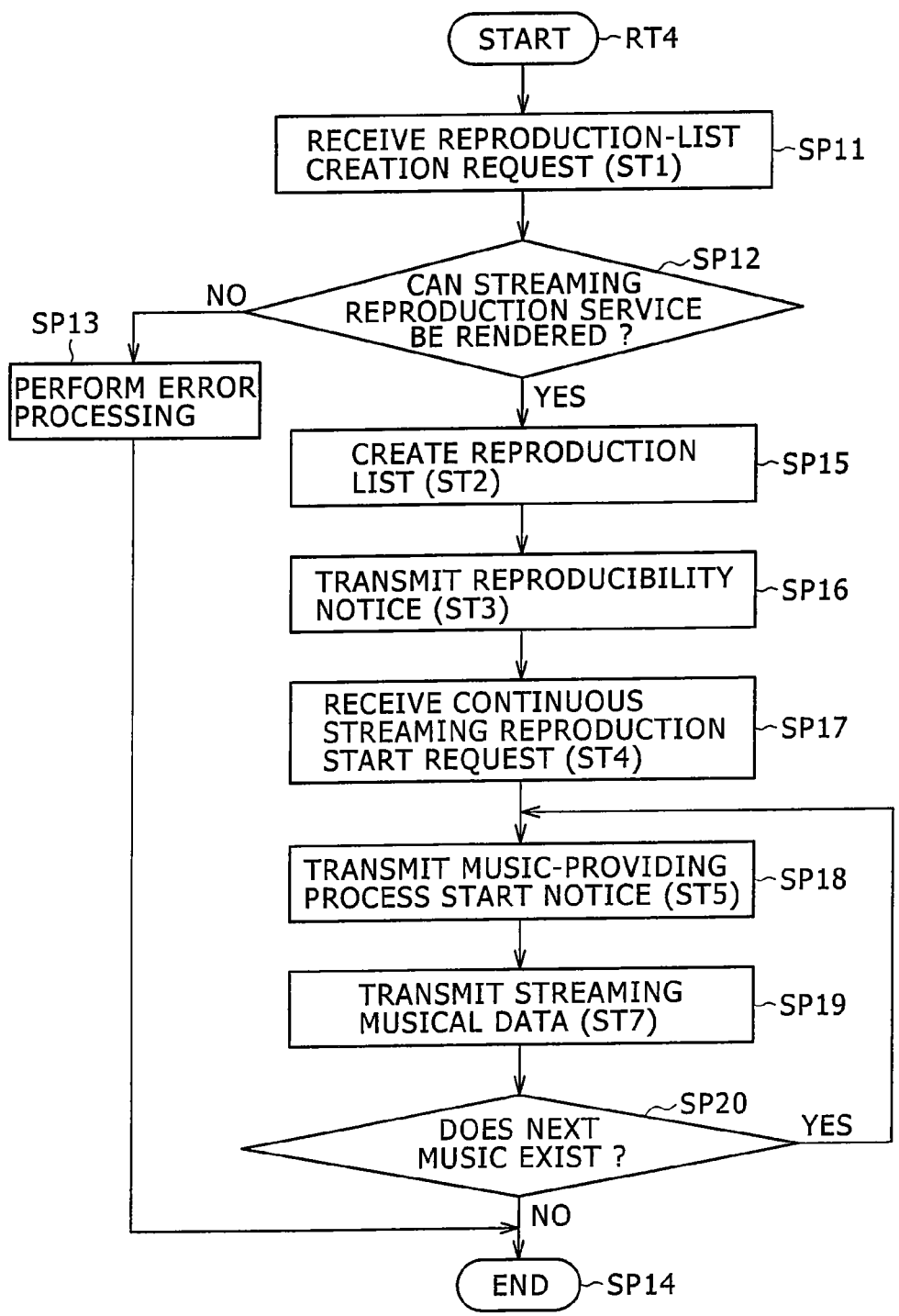
FIG. 10 shows a flowchart of a music-providing processing procedure.

First of all, a music providing processing procedure RT4 executed by the music providing server 2 is described by referring to a flowchart shown in FIG. 10 as follows.

When a reproduction-list creation request signal is received from the music reproduction terminal 4 at the first step SP11, the flow of the procedure goes on to the next step SP12 at which the control section 9 employed in the music providing server 2 produces a result of determination as to whether or not a continuous streaming reproduction service can be rendered to the music reproduction terminal 4 identified by a terminal ID included in the received reproduction-list creation request signal. If the determination result produced at step SP12 is a denial, the flow of the procedure goes on to step SP13 at which the control section 9 carries out error processing by typically informing the user that a continuous streaming reproduction service is not able to be rendered to the user then, at the next step SP14, the control section 9 ends the execution of the music providing processing procedure RT4. This is because the denial result indicates that a continuous streaming reproduction service is not able to be rendered to the music reproduction terminal 4 due to the fact that the user of the music reproduction terminal 4 is not a registered user subscribing to the service. If the determination result produced at step SP12 is an affirmation, on the other hand, the flow of the procedure goes on to step SP15 at which the control section 9 creates a reproduction list L1 by execution of either of the reproduction-list generation processing procedures RT1, RT2 and RT3 described above. This is because the affirmation result indicates that a continuous streaming reproduction service can be rendered to the music reproduction terminal 4.

After the process to create the reproduction list L1 is ended normally, the flow of the procedure goes on to the next step SP16 at which the control section 9 employed in the music providing server 2 transmits a reproducibility notice signal to the music reproduction terminal 4. Right after the transmission, the flow of the procedure goes on to the next step SP17 at which the control section 9 receives a continuous streaming reproduction start request signal from the music reproduction terminal 4. After the continuous streaming reproduction start request signal is received from the music reproduction terminal 4, the flow of the procedure goes on to the next step SP18 at which the control section 9 transmits a music-providing process start notice signal to the music reproduction terminal 4 as a signal informing the music reproduction terminal 4 that a process to provide streaming musical data to the music reproduction terminal 4 has been started.

Then, the flow of the procedure goes on to the next step SP19 at which the control section 9 employed in the music providing server 2 detects a storage location associated with the musical-data ID in accordance with the order of reproduction from the reproduction list L1 and reads out musical data stored in the detected storage location from the server storage section 10. Then, the control section 9 transmits the musical data read out from the server storage section 10 to the music reproduction terminal 4 as streaming musical data.

After the musical data is transmitted to the music reproduction terminal 4, the flow of the procedure goes on to the next step SP20 at which the control section 9 employed in the music providing server 2 produces a result of determination as to whether or not next musical data in the order of reproduction exists on the reproduction list L1. If the determination result produced at step SP20 is an affirmation indicating that the next musical data in the order of reproduction exists on the reproduction list L1, the flow of the procedure goes back to step SP18 at which the control section 9 employed in the music providing server 2 transmits a music-providing process start notice signal to the music reproduction terminal 4 as a signal informing the music reproduction terminal 4 that a process to provide the next streaming musical data to the music reproduction terminal 4 in the order of reproduction has been started. If the determination result produced at step SP20 is a denial, on the other hand, the flow of the procedure goes on to the last step SP14 at which the control section 9 employed in the music providing server 2 ends the execution of the music providing processing procedure RT4. This is because the denial result indicates that the musical-data ID identifying the musical data to be reproduced next in the streaming reproduction process does not exist on the reproduction list L1.

Figure 11:
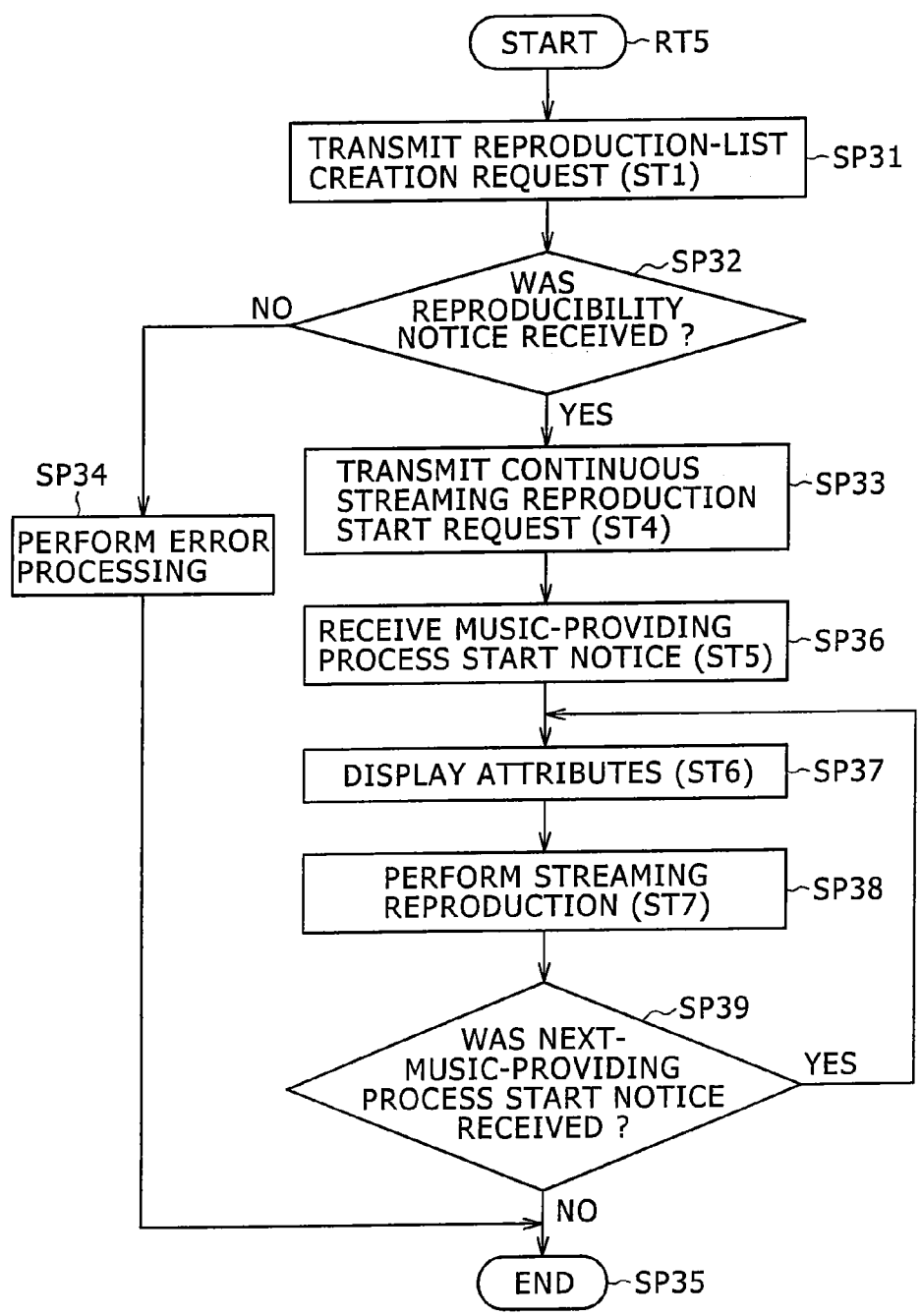
FIG. 11 shows a flowchart of a music reproduction processing procedure.

Next, a music reproduction processing procedure RT5 executed by the music reproduction terminal 4 is explained by referring to a flowchart shown in FIG. 11.

When a continuous streaming reproduction operation is carried out on the operation section 5 employed in the music reproduction terminal 4 in order to make a request for a continuous streaming reproduction process to reproduce a plurality of pieces of musical data, at the first step SP31, the control section 6 employed in the music reproduction terminal 4 transmits a reproduction-list creation request signal to the music providing server 2 as a signal making a request for creation of a reproduction list L1.

Then, at the next step SP32, the control section 6 employed in the music reproduction terminal 4 produces a result of determination as to whether or not a reproducibility notice signal has been transmitted from the music providing server 2 in a state of waiting for the reproducibility notice signal to arrive from the music providing server 2. As the reproducibility notice signal arrives from the music providing server 2, the control section 6 produces an affirmation result of determination at step SP32. In this case, the flow of the procedure goes on to step SP33. If the control section 6 employed in the music reproduction terminal 4 determines that a reproducibility notice signal is not able to arrive from the music providing server 2, on the other hand, the determination result produced at step SP32 is a denial. In this case, the flow of the procedure goes on to step SP34 at which the control section 6 carries out error processing including a process to inform the user that the request for a continuous streaming reproduction process to reproduce a plurality of pieces of musical data has been turned down. Then, at the next step SP35, the control section 6 ends the execution of the music reproduction processing procedure RT5.

At step SP33, the control section 6 employed in the music reproduction terminal 4 transmits a continuous streaming reproduction start request signal to the music providing server 2 as a signal to start a continuous streaming reproduction process to reproduce musical data in accordance with the reproduction list L1.

Then, at the next step SP36, the control section 6 employed in the music reproduction terminal 4 receives a music-providing process start notice signal transmitted by the music providing server 2. Subsequently, the flow of the procedure goes on to the next step SP37. At step SP37, the control section 6 employed in the music reproduction terminal 4 displays information based on musical-data attributes, which are included in the music-providing process start notice signal received from the music providing server 2 as the attributes of the musical data to be provided by the music providing server 2, on the display section 11 as information on the streaming musical data. The displayed information typically includes the title of the streaming musical data to be reproduced from now on in a streaming reproduction process and the names of artists associated with the streaming musical data.

Then, at the next step SP38, the control section 6 employed in the music reproduction terminal 4 carries out a streaming reproduction process to output sounds of music from the sound outputting section 13 by controlling the reproduction section 12 to sequentially reproduce the streaming musical data being received by the terminal communication section 7 from the music providing server 2.

Right after the streaming reproduction process to reproduce the streaming musical data is finished, the flow of the procedure goes on to the next step SP39 at which the control section 6 employed in the music reproduction terminal 4 produces a result of determination as to whether or not a music-providing process start notice signal to reproduce the musical data to be reproduced next in accordance with the reproduction order has been received from the music providing server 2. If the determination result produced at step SP39 is an affirmation, the flow of the procedure goes back to the next step SP37 at which the control section 6 employed in the music reproduction terminal 4 displays information based on attributes, which are included in the music-providing process start notice signal received from the music providing server 2 as the attributes of the musical data to be provided by the music providing server 2, on the display section 11 as information on the streaming musical data. As described above, the displayed information typically includes the title of the streaming musical data to be reproduced from now on in a streaming reproduction process and the names of artists associated with the streaming musical data. This is because the affirmation result produced at step SP39 means that the music-providing process start notice signal received from the music providing server 2 indicates the existence of musical data to be reproduced next in accordance with the reproduction order as musical data indicated by the received music-providing process start notice signal. If the determination result produced at step SP39 is a denial indicating that no music-providing process start notice signal to reproduce the musical data to be reproduced next in accordance with the reproduction order has been received from the music providing server 2, on the other hand, the flow of the procedure goes on to the last step SP35 at which the control section 6 employed in the music reproduction terminal 4 ends the execution of the music reproduction processing procedure RT5.

In the configuration described above, the music reproduction system 1 includes a music providing server 2, a network 3 and a music reproduction terminal 4. The music providing server 2 is an apparatus for providing musical data to the music reproduction terminal 4 by way of a transmission route including the network 3. The music reproduction terminal 4 is an apparatus for receiving musical data from the music providing server 2 and, at the same time, sequentially reproducing the received data in a streaming reproduction process.

When the user carries out a continuous streaming reproduction operation on the operation section 5 employed in the music reproduction terminal 4, the control section 6 employed in the music reproduction terminal 4 transmits a reproduction-list creation request signal including the terminal ID of the music reproduction terminal 4 to the music providing server 2.

When the music providing server 2 receives the reproduction-list creation request signal including the terminal ID of the music reproduction terminal 4 from the music reproduction terminal 4, the control section 9 employed in the music providing server 2 carries out a reproducible-music selection process to select pieces of musical data, which can be reproduced by the music reproduction terminal 4 identified by the terminal ID included in the reproduction-list generation request signal in a streaming reproduction process, from a plurality of pieces of musical data stored in a server storage section 10 employed in the music providing server 2. Then, the control section 9 creates a reproduction list L1 showing an order of reproduction of the selected pieces of musical data.

Subsequently, the control section 9 employed in the music providing server 2 sequentially provides the musical data read out from the server storage section 10 to the music reproduction terminal 4 as streaming musical data in accordance with the reproduction order shown in the created reproduction list L1.

Thus, the music reproduction terminal 4 is capable of sequentially receiving the streaming musical data sequentially provided by the music providing server 2 in accordance with the reproduction list L1 held in the music providing server 2 and sequentially reproducing the received streaming musical data.

In accordance with the configuration described above, it is possible to realize a music reproduction system 1 in which the music reproduction terminal 4 is capable of sequentially receiving the streaming musical data sequentially provided by the music providing server 2 in accordance with the reproduction list L1 held in the music providing server 2 and sequentially reproducing the received streaming musical data and, in addition, the music reproduction terminal 4 is capable of reproducing musical data with a substantially high degree of efficiency without the need for the user to spend long time and much labor.

(3) Second Embodiment

A second embodiment implements the music reproduction system 1, the music providing server 2 and the music reproduction terminal 4, which have configurations identical with the configurations of their respective counterparts implemented by the first embodiment. In the case of the second embodiment, as shown in FIG. 5, the music providing server 2 holds the reproduction list L1 as is the case with the first embodiment. The following description is focused on differences between the first and second embodiments.

Figure 12:
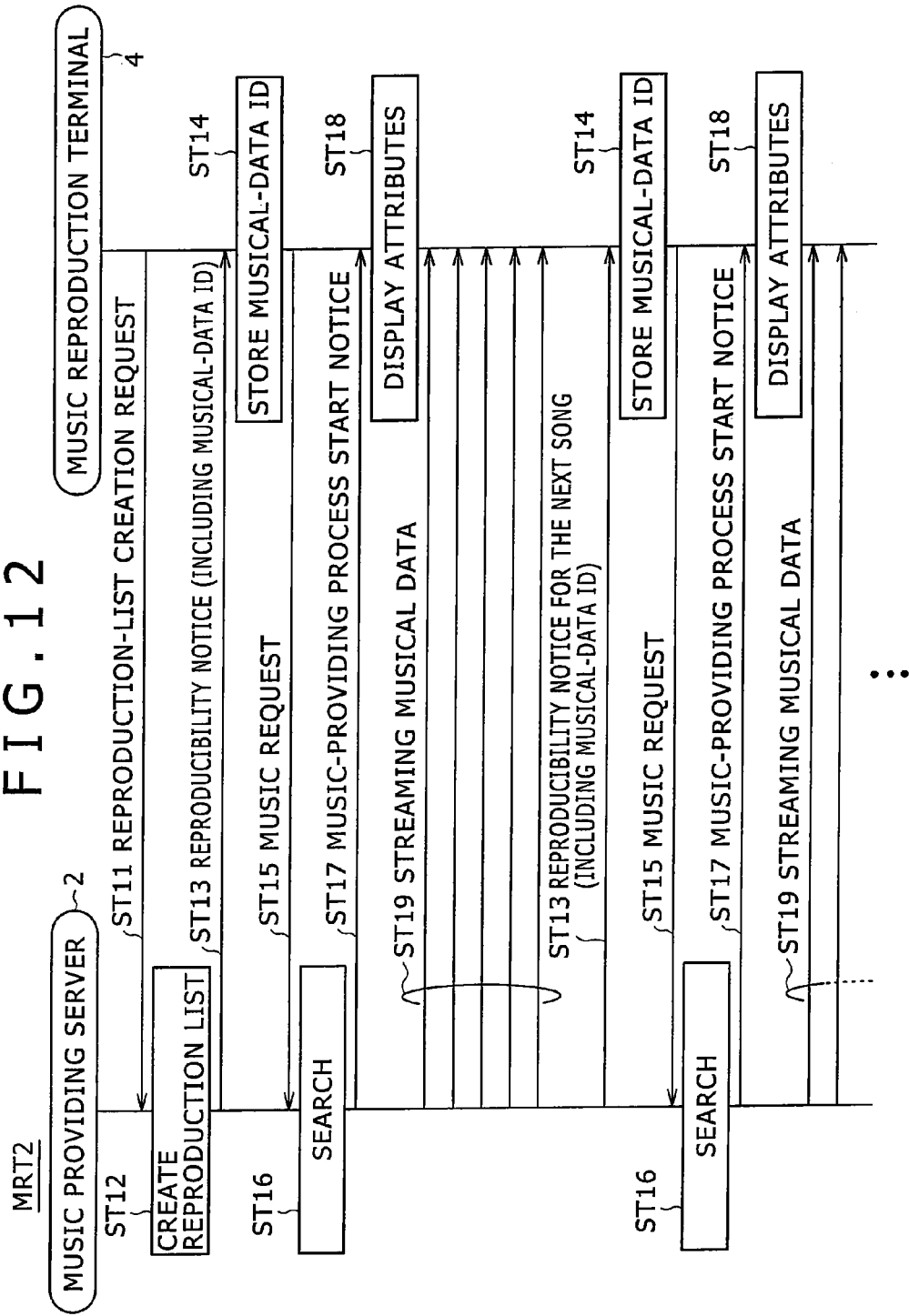
FIG. 12 shows a flowchart of a continuous streaming reproduction processing procedure.

When a continuous streaming reproduction operation is carried out on the operation section 5 employed in the music reproduction terminal 4 in order to make a request for a continuous streaming reproduction process to reproduce a plurality of pieces of musical data, at step ST11 of a procedure shown in FIG. 12, the control section 6 employed in the music reproduction terminal 4 transmits a reproduction-list creation request signal to the music providing server 2 by way of a transmission route including the terminal communication section 7 employed in the music reproduction terminal 4 and the network 3 following the terminal communication section 7 as a signal making a request for creation of a reproduction list L1 to be used in the continuous streaming reproduction process. The reproduction-list creation request signal includes a terminal ID for identifying the music reproduction terminal 4. In some cases, the reproduction-list creation request signal according to this embodiment may include a reproduction-list creation condition showing a requirement for creation of a reproduction list. The reproduction-list creation request signal according to this embodiment may also include a desired reproduction list.

When the server communication section 8 employed in the music providing server 2 shown in FIG. 6B receives a reproduction-list creation request signal transmitted by the music reproduction terminal 4, the control section 9 employed in the music providing server 2 carries out one of the reproduction-list creation processes RT1, RT2 and RT3 at step ST12 of the procedure shown in FIG. 12 in order to create a reproduction list L1.

After the control section 9 employed in the music providing server 2 stores a reproduction list L1 created in the reproduction-list generation processing procedure RT1, RT2 or RT3 in the server storage section 10 as described above, at step ST13 of the procedure shown in FIG. 12, the control section 9 transmits a reproducibility notice signal to the music reproduction terminal 4 by way of a transmission route including the server communication section 8 and the network 3 following the server communication section 8 as a signal informing the music reproduction terminal 4 that a continuous streaming reproduction process can be carried out in accordance with the reproduction list L1 stored in the server storage section 10. At that time, the control section 9 employed in the music providing server 2 acquires a musical-data ID from the reproduction list L1 as the musical-data ID of musical data to be reproduced first by the music reproduction terminal 4 and includes the acquired musical-data ID in the reproducibility notice signal to be transmitted to the music reproduction terminal 4.

When the terminal communication section 7 employed in the music reproduction terminal 4 receives the reproducibility notice signal including the musical-data ID from the music providing server 2, at step ST14 of the procedure shown in FIG. 12, the control section 6 employed in the music reproduction terminal 4 stores the musical-data ID included in the reproducibility notice signal in the terminal storage section 14.

Then, at step ST15 of the procedure shown in FIG. 12, the control section 6 employed in the music reproduction terminal 4 transmits a music request signal to the music providing server 2 by way of a transmission route including the terminal communication section 7 employed in the music reproduction terminal 4 and the network 3 following the terminal communication section 7 as a signal requesting the music providing server 2 to provide the music reproduction terminal 4 with musical data identified by the musical-data ID stored in the terminal storage section 14 as streaming musical data. At that time, as shown in FIG. 9B, the control section 6 employed in the music reproduction terminal 4 includes the musical-data ID used for identifying musical data requested as musical data to be provided by the music providing server 2 and the terminal ID identifying the music reproduction terminal 4 in the music request signal.

When the server communication section 8 employed in the music providing server 2 receives the music request signal including the musical-data ID and the terminal ID from the music reproduction terminal 4, the control section 9 employed in the music providing server 2 confirms the existence of the reproduction list L1 including the musical-data ID. If the existence of the reproduction list L1 can be confirmed, at step ST16 of the procedure shown in FIG. 12, the control section 9 employed in the music providing server 2 searches the reproduction list L1 for a storage location of the musical data identified by the musical-data ID. Then, at step ST17 of the procedure shown in FIG. 12, the control section 9 transmits a music-providing process start notice signal to the music reproduction terminal 4 by way of a transmission route including the server communication section 8 and the network 3 following the server communication section 8 as a signal informing the music reproduction terminal 4 that a process to transmit musical data to the music reproduction terminal 4 as streaming musical data to the music reproduction terminal 4 has been started. By the way, the music-providing process start notice signal includes attributes of the streaming musical data to be provided first by the music providing server 2. Typically, the attributes include information such as the title of a piece of streaming musical data provided initially to the music reproduction terminal 4 and the name of an artist associated with the initial piece of streaming musical data.

When the terminal communication section 7 employed in the music reproduction terminal 4 receives the music-providing process start notice signal from the music providing server 2, at step ST18 of the procedure shown in FIG. 12, the control section 6 employed in the music reproduction terminal 4 displays information based on the attributes included in the music-providing process start notice signal from the music providing server 2 on the display section 11 as information on the streaming musical data. The displayed information typically includes the title of the streaming musical data to be reproduced from now on in a streaming reproduction process and the names of artists associated with the streaming musical data.

After transmitting a music-providing process start notice signal to the music reproduction terminal 4, at step ST16 of the procedure shown in FIG. 12, the control section 9 employed in the music providing server 2 refers to the reproduction list L1 to recognize a storage location associated with the first musical-data ID in the reproduction order. Then, the control section 9 reads out musical data from the storage location recognized as a storage location in the server storage section 10 and transmits the musical data read out from the server storage section 10 to the music reproduction terminal 4 by way of a transmission route including the server communication section 8 and the network 3 following the server communication section 8 as streaming musical data at step S19 of the procedure shown in FIG. 12.

Thus, the control section 6 employed in the music reproduction terminal 4 is capable of outputting sounds of music from the sound outputting section 13 by controlling the reproduction section 12 to sequentially reproduce the streaming musical data being received by the terminal communication section 7 from the music providing server 2.

Immediately after the control section 9 employed in the music providing server 2 finishes the transmission of the first streaming musical data shown in the reproduction list L1, the control section 9 transmits each of the subsequent pieces of streaming musical data shown in the reproduction list L1 by executing the same procedure as the steps ST13 to ST19 described above.

Next, the continuous streaming reproduction procedure MRT2 shown in FIG. 12 is explained by dividing the procedure into a processing procedure executed by the music providing server 2 and a processing procedure executed by the music reproduction terminal 4 as follows.

Figure 13:
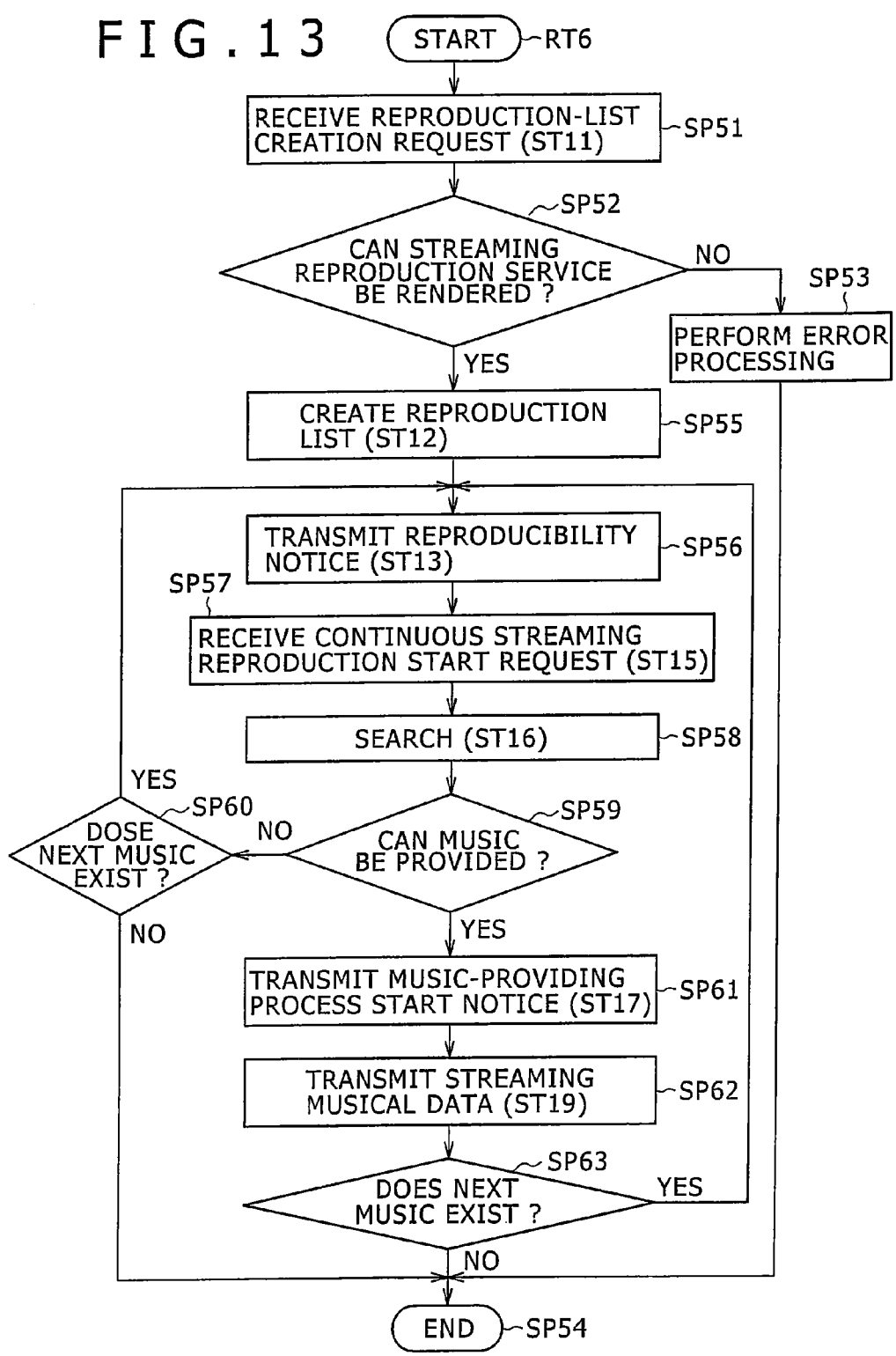
FIG. 13 shows a flowchart of a music-providing processing procedure.

First of all, a music providing processing procedure RT6 executed by the music providing server 2 is described by referring to a flowchart shown in FIG. 13 as follows.

When a reproduction-list creation request signal is received from the music reproduction terminal 4 at the first step SP51, the flow of the procedure goes on to step SP52 at which the control section 9 employed in the music providing server 2 produces a result of determination as to whether or not a continuous streaming reproduction service can be rendered to the music reproduction terminal 4 identified by a terminal ID included in the received reproduction-list creation request signal. If the determination result produced at step SP52 is a denial, the flow of the procedure goes on to step SP53 at which the control section 9 employed in the music providing server 2 carries out error processing by typically informing the user that a continuous streaming reproduction service is not able to be rendered to the user then, at the next step SP54, the control section 9 ends the execution of the music providing processing procedure RT6. This is because the denial result indicates that a continuous streaming reproduction service is not able to be rendered to the music reproduction terminal 4 due to the fact that the user of the music reproduction terminal 4 is not a registered user subscribing to the service. If the determination result produced at step SP52 is an affirmation, on the other hand, the flow of the procedure goes on to step SP55 at which the control section 9 employed in the music providing server 2 creates a reproduction list L1 by execution of either of the reproduction-list generation processing procedures RT1, RT2 and RT3 described above. This is because the affirmation result indicates that a continuous streaming reproduction service can be rendered to the music reproduction terminal 4.

After the process to create the reproduction list L1 is ended normally, the flow of the procedure goes on to the next step SP56 at which the control section 9 employed in the music providing server 2 transmits a reproducibility notice signal to the music reproduction terminal 4 as a signal including the musical-data ID of musical data to be reproduced first in a streaming reproduction process.

Right after the transmission, the flow of the procedure goes on to the next step SP57 at which the control section 9 employed in the music providing server 2 receives a music request signal including a terminal ID and a musical-data ID from the music reproduction terminal 4. Then, the control section 9 confirms the existence of the reproduction list L1 showing the musical-data ID. If the existence of the reproduction list L1 can be confirmed, the flow of the procedure goes on to step SP58 at which, the control section 9 employed in the music providing server 2 searches the reproduction list L1 for a storage location of the musical data identified by the musical-data ID.

Then, the flow of the procedure goes on to the next step SP59 at which the control section 9 employed in the music providing server 2 produces a result of determination as to whether or not the musical data stored at the storage location found in the process to search the reproduction list L1 can be provided to the music reproduction terminal 4.

If the determination result produced at step SP59 is a denial, the flow of the procedure goes on to step SP60 at which the control section 9 employed in the music providing server 2 produces a result of determination as to whether or not musical data to be reproduced next in accordance with the reproduction order is included on the reproduction list L1. This is because the denial result typically indicates that no musical data is stored at the storage location and can be provided to the music reproduction terminal 4. If the determination result produced at step SP60 is an affirmation indicating that the reproduction list L1 includes the musical ID of the next musical data that can be reproduced in a streaming reproduction process, the flow of the procedure goes back to step SP56 at which the control section 9 employed in the music providing server 2 transmits a reproducibility notice signal to the music reproduction terminal 4 as a signal including the musical-data ID of the next musical data to be reproduced in a streaming reproduction process. If the determination result produced at step SP60 is a denial, on the other hand, the flow of the procedure goes on to the last step SP54 at which the control section 9 ends the execution of the music providing processing procedure RT6. This is because the denial result indicates that the reproduction list L1 does not include the musical ID of the next musical data that can be reproduced in a streaming reproduction process.

If the determination result produced at step SP59 is an affirmation, on the other hand, the flow of the procedure goes on to step SP61 at which the control section 9 employed in the music providing server 2 transmits a music-providing process start notice signal to the music reproduction terminal 4 as a signal informing the music reproduction terminal 4 that a process to provide streaming musical data to the music reproduction terminal 4 has been started. This is because the affirmation result typically indicates that musical data has been stored at the storage location and can be provided to the music reproduction terminal 4.

Then, the flow of the procedure goes on to the next step SP62 at which the control section 9 employed in the music providing server 2 reads out musical data stored in the storage location found in the search process carried out on the reproduction list L1 from the server storage section 10. Then, the control section 9 transmits the musical data read out from the server storage section 10 to the music reproduction terminal 4 as streaming musical data.

After the musical data is transmitted to the music reproduction terminal 4, the flow of the procedure goes on to the next step SP63 at which the control section 9 employed in the music providing server 2 produces a result of determination as to whether or not next musical data in the order of reproduction exists on the reproduction list L1. If the determination result produced at step SP63 is an affirmation indicating that the next musical data in the order of reproduction exists on the reproduction list L1, the flow of the procedure goes back to step SP56 at which the control section 9 employed in the music providing server 2 transmits a reproducibility notice signal to the music reproduction terminal 4 as a signal including the musical-data ID of the next musical data to be reproduced in a streaming reproduction process. If the determination result produced at step SP63 is a denial, on the other hand, the flow of the procedure goes on to the last step SP54 at which the control section 9 employed in the music providing server 2 ends the execution of the music providing processing procedure RT6. This is because the denial result indicates that the musical-data ID identifying the musical data to be reproduced next in the streaming reproduction process does not exist on the reproduction list L1.

Figure 14:
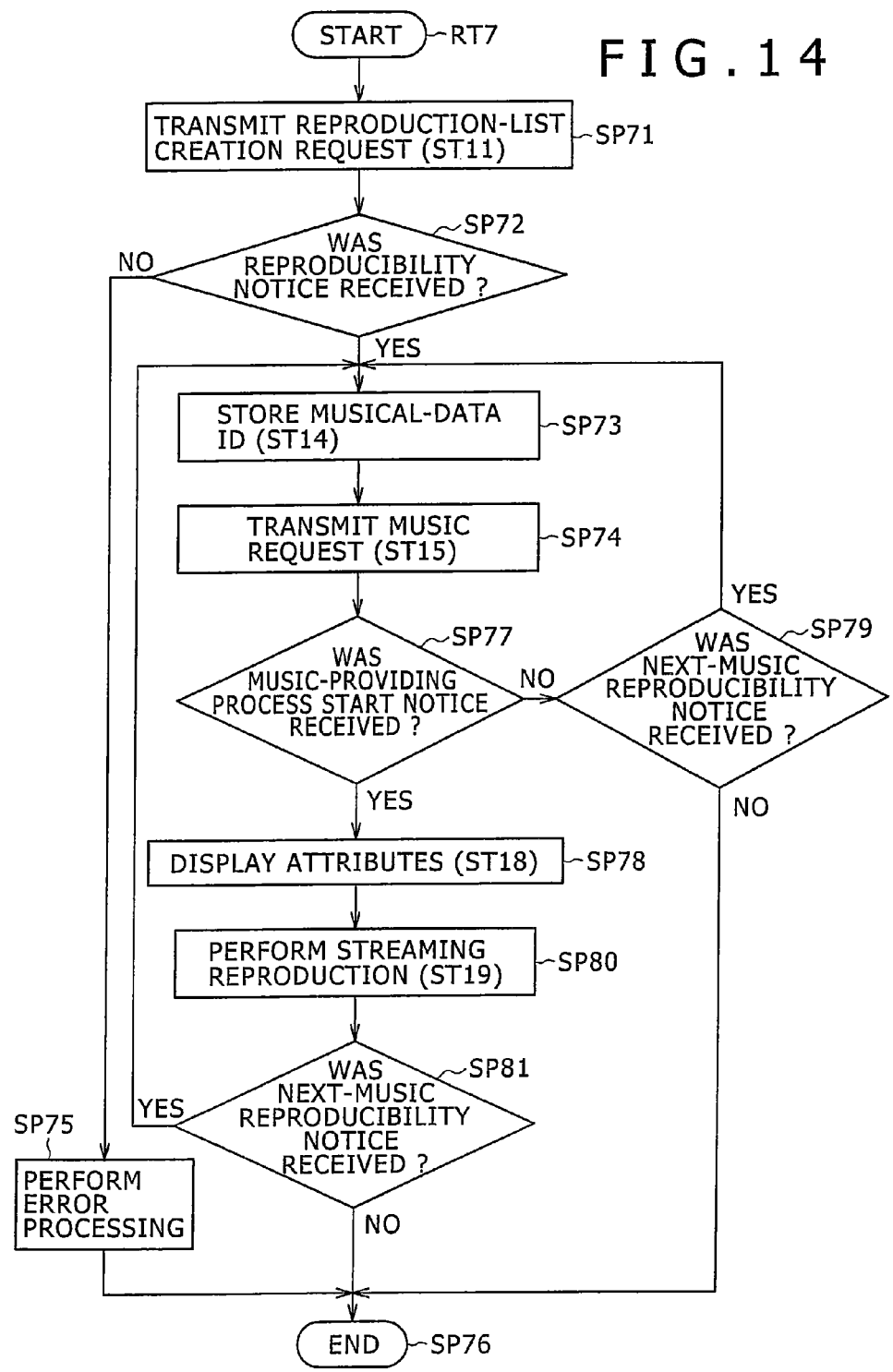
FIG. 14 shows a flowchart of a music reproduction processing procedure.

Next, a music reproduction processing procedure RT7 executed by the music reproduction terminal 4 is explained by referring to a flowchart shown in FIG. 14.

When a continuous streaming reproduction operation is carried out on the operation section 5 employed in the music reproduction terminal 4 in order to make a request for a continuous streaming reproduction process to reproduce a plurality of pieces of musical data, at the first step SP71, the control section 6 employed in the music reproduction terminal 4 transmits a reproduction-list creation request signal to the music providing server 2 as a signal making a request for creation of a reproduction list L1.

Then, at the next step SP72, the control section 6 employed in the music reproduction terminal 4 produces a result of determination as to whether or not a reproducibility notice signal has been transmitted from the music providing server 2 in a state of waiting for the reproducibility notice signal to arrive from the music providing server 2. As the reproducibility notice signal arrives from the music providing server 2, the control section 6 produces an affirmation result of determination at step SP72. In this case, the flow of the procedure goes on to step SP73 at which the control section 6 stores the musical-data ID included in the received reproducibility notice signal in the terminal storage section 14. Then, the flow of the procedure goes on to the next step SP74. If the control section 6 employed in the music reproduction terminal 4 determines that a reproducibility notice signal is not able to arrive from the music providing server 2, on the other hand, the determination result produced at step SP72 is a denial. In this case, the flow of the procedure goes on to step SP75 at which the control section 6 employed in the music reproduction terminal 4 carries out error processing including a process to inform the user that the request for a continuous streaming reproduction process to reproduce a plurality of pieces of musical data has been turned down. Then, at the next step SP76, the control section 6 employed in the music reproduction terminal 4 ends the execution of the music reproduction processing procedure RT7.

At step SP74, the control section 6 employed in the music reproduction terminal 4 transmits a music request signal to the music providing server 2 as a signal requesting the music providing server 2 to provide the music reproduction terminal 4 with musical data identified by the musical-data ID stored in the terminal storage section 14 as streaming musical data.

Then, at the next step SP77, the control section 6 employed in the music reproduction terminal 4 produces a result of determination as to whether or not a music-providing process start notice signal has been transmitted by the music providing server 2 in a state of waiting for the music-providing process start notice signal to arrive from the music providing server 2. As the reproducibility notice signal arrives from the music providing server 2, the control section 6 produces an affirmation result of determination at step S77. In this case, the flow of the procedure goes on to step SP78. If the control section 6 employed in the music reproduction terminal 4 determines that a music-providing process start notice signal does not arrive from the music providing server 2, on the other hand, the determination result produced at step SP77 is a denial. In this case, the flow of the procedure goes on to step SP79 at which the control section 6 produces a result of determination as to whether or not a reproducibility notice signal including the musical-data ID of the musical data to be reproduced next in a streaming reproduction process has been transmitted from the music providing server 2 in a state of waiting for the reproducibility notice signal, which includes the musical-data ID of the musical data to be reproduced next in a streaming reproduction process, to arrive from the music providing server 2 instead of waiting for the music-providing process start notice signal determined at step SP77 not to arrive from the music providing server 2. As the reproducibility notice signal arrives from the music providing server 2, the control section 6 employed in the music reproduction terminal 4 produces an affirmation result of determination at step S79. In this case, the flow of the procedure goes back to step SP73 at which the control section 6 stores the musical-data ID included in the received reproducibility notice signal in the terminal storage section 14. If the control section 6 determines that a reproducibility notice signal does not arrive from the music providing server 2, on the other hand, the determination result produced at step SP79 is a denial. In this case, the flow of the procedure goes on to the last step SP76 at which the control section 6 employed in the music reproduction terminal 4 ends the execution of the music reproduction processing procedure RT7.

At step SP78, the control section 6 employed in the music reproduction terminal 4 displays information based on musical-data attributes, which are included in the music-providing process start notice signal received from the music providing server 2 as the attributes of the musical data to be provided by the music providing server 2, on the display section 11 as information on the streaming musical data. The displayed information typically includes the title of the streaming musical data to be reproduced from now on in a streaming reproduction process and the names of artists associated with the streaming musical data.

Then, at the next step SP80, the control section 6 employed in the music reproduction terminal 4 carries out a streaming reproduction process to output sounds of music from the sound outputting section 13 by controlling the reproduction section 12 to sequentially reproduce the streaming musical data being received by the terminal communication section 7 from the music providing server 2.

Right after the streaming reproduction process to reproduce the streaming musical data is finished, the flow of the procedure goes on to the next step SP81 at which the control section 6 employed in the music reproduction terminal 4 produces a result of determination as to whether or not a reproducibility notice signal including the musical-data ID of the musical data to be reproduced next in a streaming reproduction process has been transmitted from the music providing server 2 in a state of waiting for the reproducibility notice signal to arrive from the music providing server 2. As the reproducibility notice signal arrives from the music providing server 2, the control section 6 employed in the music reproduction terminal 4 produces an affirmation result of determination at step SP81. In this case, the flow of the procedure goes back to step SP73 at which the control section 6 stores the musical-data ID included in the received reproducibility notice signal in the terminal storage section 14. If the control section 6 determines that a reproducibility notice signal does not arrive from the music providing server 2, on the other hand, the determination result produced at step SP81 is a denial. In this case, the flow of the procedure goes on to the last step SP76 at which the control section 6 employed in the music reproduction terminal 4 ends the execution of the music reproduction processing procedure RT7.

In the configuration described above, the control section 9 employed in the music providing server 2 creates a reproduction list L1 showing the musical-data ID of each musical data to be provided to the music reproduction terminal 4.

Then, before musical data is provided by the music providing server 2 to the music reproduction terminal 4 in accordance with the reproduction list L1 as streaming musical data, the control section 9 employed in the music providing server 2 stores the musical-data ID of the musical data in the music reproduction terminal 4.

Thus, even if an error occurs in the music reproduction system 1 due to a failure of the network 3 while streaming musical data is being transmitted from the music providing server 2 to the music reproduction terminal 4 and causes the transmission to be temporarily suspended, the musical-data ID of the streaming musical data being transmitted has already been stored in the music reproduction terminal 4. As a result, the streaming reproduction process of the musical data identified by the stored musical-data ID stored can be resumed.

As explained above, in accordance with the configuration, even if an error is detected due to a failure of the network 3 while streaming musical data is being transmitted from the music providing server 2 to the music reproduction terminal 4 and causes the transmission to be temporarily stopped, the musical-data ID of the streaming musical data being transmitted has already been stored in the music reproduction terminal 4. As a result, the streaming reproduction process of the musical data identified by the stored musical-data ID stored can be resumed so that the user-friendliness of the music reproduction system 1 can be enhanced considerably.

(4) Third Embodiment

A third embodiment implements the music reproduction system 1, the music providing server 2 and the music reproduction terminal 4, which have configurations identical with the configurations of their respective counterparts implemented by the first embodiment. The following description is focused on differences between the first and third embodiments.

Figure 15:
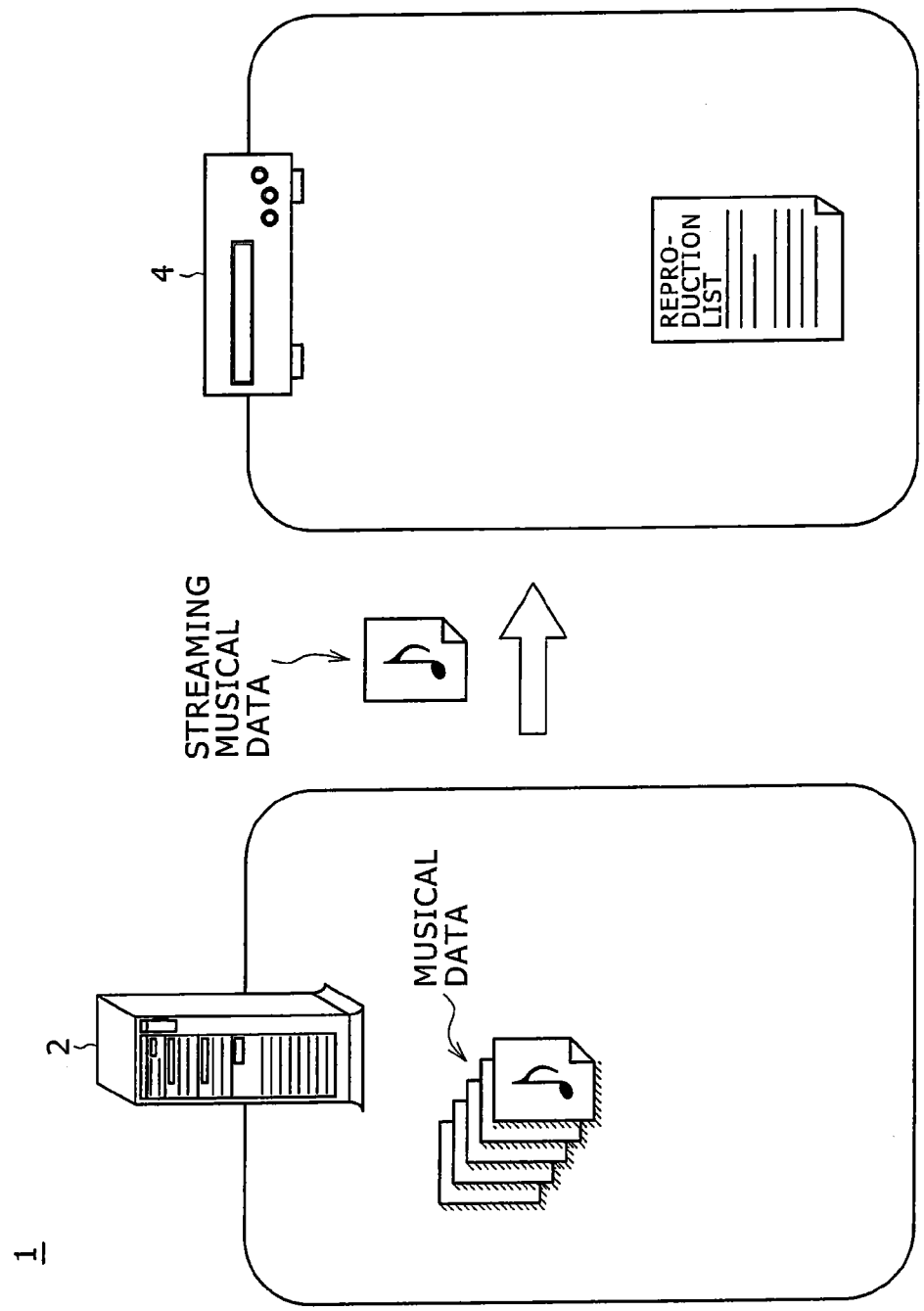
FIG. 15 is an explanatory rough diagram showing a music reproduction system in which the music reproduction terminal holds a reproduction list.

In the case of the third embodiment, as shown in FIG. 15, the music reproduction terminal 4 holds the music reproduction order information referred to as the reproduction list showing an order of reproduction of pieces of musical data. The music reproduction terminal 4 requests the music providing server 2 to provide pieces of streaming musical data in an order shown by the reproduction list. The music reproduction terminal 4 then receives the requested pieces of streaming musical data from the music providing server 2 and reproduces them. Thus, in accordance with the music reproduction system 1, the music reproduction terminal 4 is capable of reproducing a plurality of pieces of musical data in a streaming reproduction process in an order shown by the reproduction list held by the music reproduction terminal 4. This scheme is explained in more detail as follows.

Figure 16:
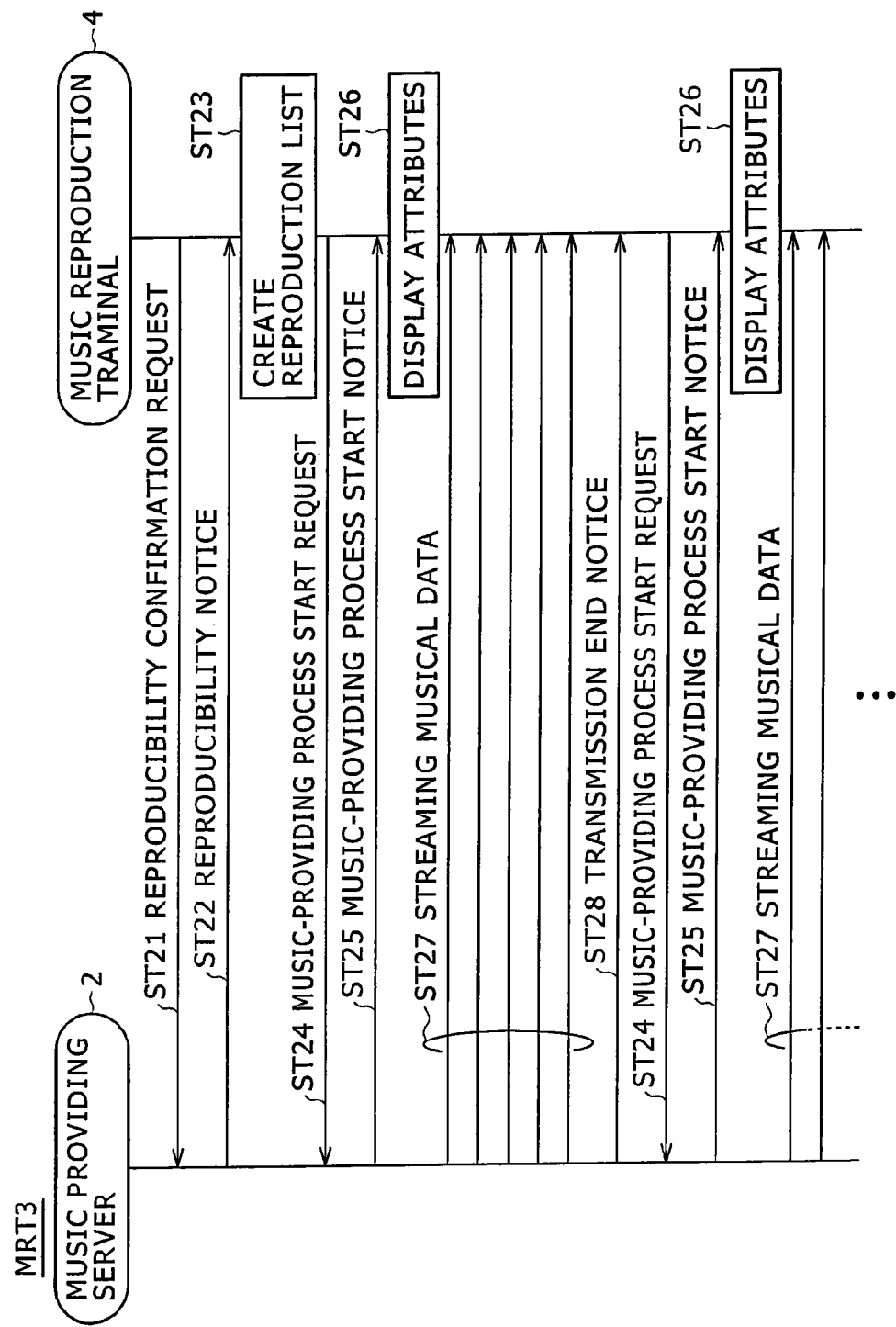
FIG. 16 shows a flowchart of a continuous streaming reproduction processing procedure.

When a continuous streaming reproduction operation is carried out on the operation section 5 employed in the music reproduction terminal 4 in order to make a request for a continuous streaming reproduction process to reproduce a plurality of pieces of musical data, at step ST21 of a procedure shown in FIG. 16, the control section 6 employed in the music reproduction terminal 4 transmits a reproducibility confirmation request signal to the music providing server 2 by way of a transmission route including the terminal communication section 7 employed in the music reproduction terminal 4 and the network 3 following the terminal communication section 7 as a signal requesting the music providing server 2 to confirm that the music reproduction terminal 4 is entitled to a continuous streaming reproduction service. The transmitted reproducibility confirmation request signal includes the terminal ID of the music reproduction terminal 4.

When the server communication section 8 employed in the music providing server 2 receives the reproducibility confirmation request signal from the music reproduction terminal 4, the control section 9 employed in the music providing server 2 produces a result of determination as to whether or not a continuous streaming reproduction service can be rendered to the music reproduction terminal 4 identified by the terminal ID included in the reproducibility confirmation request signal. If the user has been registered in the music providing server 2 as a user subscribing to the continuous streaming reproduction service, for example, the control section 9 employed in the music providing server 2 confirms that a continuous streaming reproduction service can be rendered to the music reproduction terminal 4. In this case, the control section 9 employed in the music providing server 2 transmits a reproducibility notice signal to the music reproduction terminal 4 by way of a transmission route including the server communication section 8 and the network 3 following the server communication section 8 at step ST22 of the procedure shown in FIG. 16 as a signal informing the music reproduction terminal 4 that a continuous streaming reproduction service can be rendered to the music reproduction terminal 4.

When the terminal communication section 7 employed in the music reproduction terminal 4 receives the reproducibility notice signal from the music providing server 2, the control section 6 employed in the music reproduction terminal 4 carries out a process to create a reproduction list in conformity with the signal at step ST23 of the procedure shown in FIG. 16.

Figure 17:
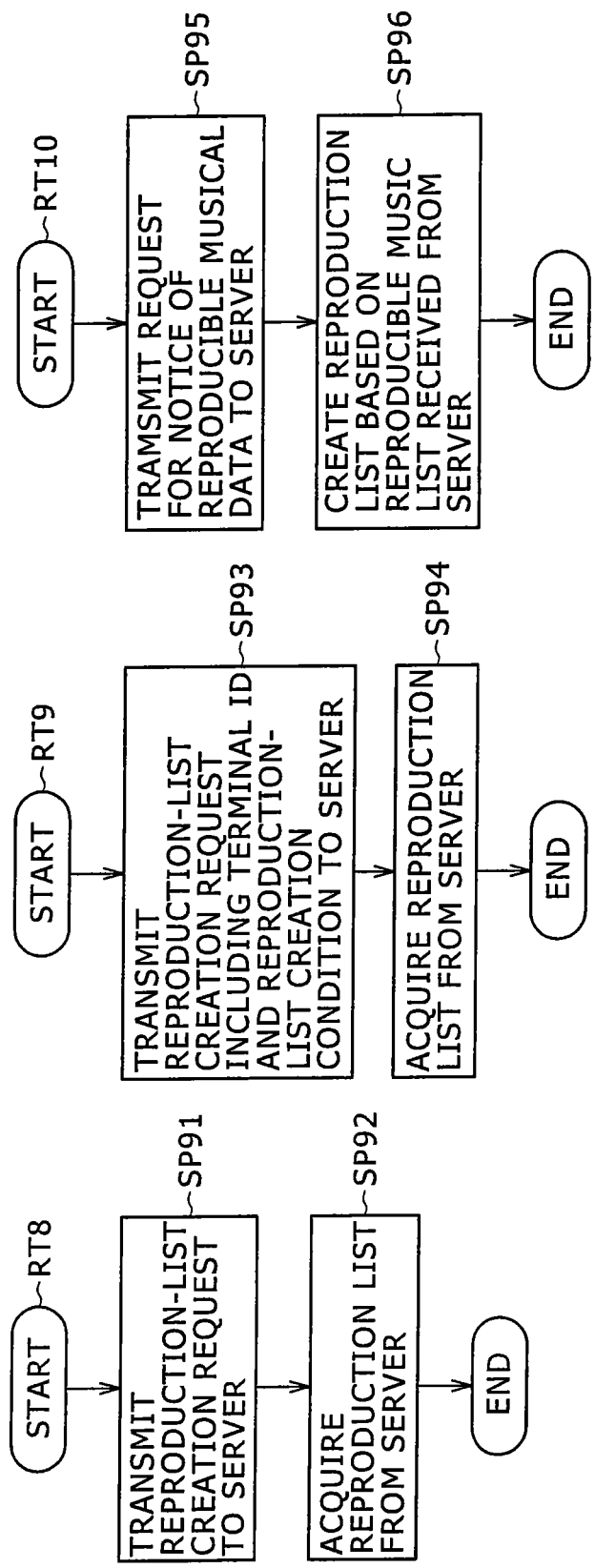
FIGS. 17A to 17C show flowcharts of reproduction-list creation processing procedures.

The processing to create a reproduction list is explained by referring to flowcharts shown in FIG. 17 as follows. In the case of a reproduction-list creation processing RT8 represented by the flowchart shown in FIG. 17A, for example, at the first step SP91, the control section 6 employed in the music reproduction terminal 4 transmits a reproduction-list creation request signal including the terminal ID of the music reproduction terminal 4 to the music providing server 2 by way of a transmission route including the terminal communication section 7 and the network 3 following the terminal communication section 7. The control section 9 employed in the music providing server 2 receiving the reproduction-list creation request signal carries out a reproducible-music selection process to select pieces of musical data each reproducible by the music reproduction terminal 4 identified by the terminal ID included in the reproduction-list creation request signal in a streaming reproduction process from a plurality of pieces of musical data stored in the server storage section 10. Then, by arranging the musical-data IDs of the reproducible pieces of musical data selected in the reproducible-music selection process in a reproduction order, the control section 9 is capable of creating a reproduction list L2 like one shown in FIG. 18A. Subsequently, the control section 9 transmits the created reproduction list L2 to the music reproduction terminal 4 by way of a transmission route including the server communication section 8 and the network 3 following the server communication section 8. When the terminal communication section 7 employed in the music reproduction terminal 4 receives the reproduction list L2 from the music providing server 2, at step SP92, the control section 6 employed in the music reproduction terminal 4 stores the received reproduction list L2 in the terminal storage section 14. By the way, when the control section 9 employed in the music providing server 2 creates the reproduction list L2, the control section 9 associates each musical-data ID put on the created reproduction list L2 with a server ID of the music providing server 2, which provides musical data identified by the musical-data ID.

In the case of a reproduction-list creation processing RT9 represented by the flowchart shown in FIG. 17B, at the first step SP93, the control section 6 employed in the music reproduction terminal 4 transmits a reproduction-list creation request signal including the terminal ID of the music reproduction terminal 4 to the music providing server 2 by way of a transmission route including the terminal communication section 7 employed in the music reproduction terminal 4 and the network 3 following the terminal communication section 7. In addition to the terminal ID, the reproduction-list creation request signal also includes a reproduction-list creation condition, which is a condition for creation of a reproduction list L2. The control section 9 employed in the music providing server 2 receiving the reproduction-list creation request signal carries out a reproducible-music selection process to select pieces of musical data each reproducible by the music reproduction terminal 4 identified by the terminal ID included in the reproduction-list creation request signal in a streaming reproduction process from a plurality of pieces of musical data stored in the server storage section 10. Then, the control section 9 creates a reproduction list L2 by arranging musical-data IDs in a reproduction order satisfying a condition specified in the condition included in the reproduction-list generation request signal as the condition for creation of the reproduction list L2. The musical-data IDs put on the reproduction list L2 are each used for identifying a specific piece of musical data extracted from the pieces of musical data selected in the reproducible-music selection process as a specific piece of musical data meeting the condition. Subsequently, the control section 9 transmits the created reproduction list L2 to the music reproduction terminal 4 by way of a transmission route including the server communication section 8 and the network 3 following the server communication section 8. When the terminal communication section 7 employed in the music reproduction terminal 4 receives the reproduction list L2 from the music providing server 2, at step SP94, the control section 6 employed in the music reproduction terminal 4 stores the received reproduction list L2 in the terminal storage section 14.

In the case of a reproduction-list creation processing RT10 represented by the flowchart shown in FIG. 17C, at the first step SP95, the control section 6 employed in the music reproduction terminal 4 transmits a reproducible-music notice request signal including the terminal ID of the music reproduction terminal 4 to the music providing server 2 by way of a transmission route including the terminal communication section 7 and the network 3 following the terminal communication section 7 as a signal requesting the music providing server 2 to inform the music reproduction terminal 4 of specific pieces of musical data stored in the server storage section 10 employed in the music providing server 2. The specific pieces of musical data are each reproducible by the music reproduction terminal 4 identified by the terminal ID included in the reproducible-music notice request signal in a streaming reproduction process. The control section 9 employed in the music providing server 2 receiving the reproduction-list creation request signal carries out a reproducible-music selection process to select pieces of musical data each reproducible by the music reproduction terminal 4 identified by the terminal ID included in the reproduction-list creation request signal in a streaming reproduction process from a plurality of pieces of musical data stored in the server storage section 10. Then, by arranging the musical-data IDs of the reproducible pieces of musical data selected in the reproducible-music selection process in a reproduction order, the control section 9 creates a reproducible-music list. When the control section 9 creates the reproducible-music list, the control section 9 associates each musical-data ID put on the created reproducible-music list as the musical-data ID of a piece of musical data found in the reproducible-music selection process with a server ID of the music providing server 2, which provides musical data identified by the musical-data ID to the music reproduction terminal 4. Subsequently, the control section 9 transmits the created reproducible-music list to the music reproduction terminal 4 by way of a transmission route including the server communication section 8 and the network 3 following the server communication section 8. When the terminal communication section 7 employed in the music reproduction terminal 4 receives the reproducible-music list from the music providing server 2, at step SP96, the control section 6 employed in the music reproduction terminal 4 creates a reproduction list L2 by arranging the musical-data IDs each shown on the received reproducible-music list as an ID associated with the server ID in any reproduction order or, to be more specific, in a reproduction order conforming to a condition set by the user. Finally, the control section 6 stores the created reproduction list L2 in the terminal storage section 14.

Figure 18:
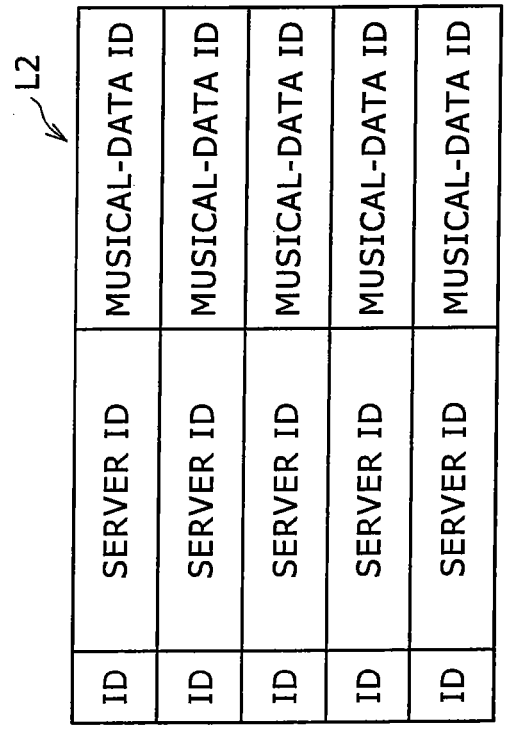
FIGS. 18A and 18B are rough diagrams showing respectively a reproduction list and information exchanged between the music providing server and the music reproduction terminal.

As described above, the control section 6 employed in the music reproduction terminal 4 stores a reproduction list L2 created by carrying out the reproduction-list creation processing RT8, RT9 or RT10 explained above in the terminal storage section 14. Then, at step ST24 of the procedure shown in FIG. 16, the control section 6 refers to the stored reproduction list L2 to recognize for example the first musical-data ID in the reproduction order and the server ID associated with the musical-data ID, transmitting a music-providing process start request signal to the music providing server 2 identified by the recognized server ID as a signal requesting the music providing server 2 to start a process of providing a piece of musical data identified by the recognized musical-data ID to the music reproduction terminal 4. By the way, as shown in FIG. 18B, the music-providing process start request signal includes the server ID of a server requested to start the process of providing a piece of musical data, the musical-data ID of the piece of the musical data and the terminal ID of the music reproduction terminal 4.

When the server communication section 8 employed in the music providing server 2 identified by the server ID included in the music-providing process start request signal receives the music-providing process start request signal from the music reproduction terminal 4, at step ST25 of the procedure shown in FIG. 16, the control section 9 employed in the music providing server 2 transmits a music-providing process start notice signal to the music reproduction terminal 4 by way of a transmission route including the server communication section 8 employed in the music providing server 2 and the network 3 following the server communication section 8 as a signal informing the music reproduction terminal 4 that the music providing server 2 has started the process of providing a piece of musical data identified by the musical-data ID included in the music-providing process start request signal to the music reproduction terminal 4. By the way, the music-providing process start notice signal includes the attributes of the musical data provided by the music providing server 2. The attributes typically include the title of the streaming musical data to be reproduced from now on in a streaming reproduction process and the names of artists associated with the streaming musical data.

When the terminal communication section 7 employed in the music reproduction terminal 4 receives the music-providing process start notice signal from the music providing server 2, at step ST26 of the procedure shown in FIG. 16, the control section 6 displays information based on musical-data attributes included in the received music-providing process start notice signal on the display section 11 as information on the streaming musical data. The displayed information typically includes the title of the streaming musical data to be reproduced from now on in a streaming reproduction process and the names of artists associated with the streaming musical data.

Then, at step ST27 of the procedure shown in FIG. 16, the control section 9 employed in the music providing server 2 identified by the server ID included in the music-providing process start request signal reads out musical data identified by the musical-data ID included in the music-providing process start request signal from the server storage section 10 and transmits the musical data read out from the server storage section 10 to the music reproduction terminal 4 identified by the terminal ID included in the music-providing process start request signal as streaming musical data.

Right after the transmission of the streaming musical data to be reproduced first in accordance with the reproduction order to the music reproduction terminal 4 is ended, at step ST28 of the procedure shown in FIG. 16, the control section 9 employed in the music providing server 2 transmits a transmission end notice signal to the music reproduction terminal 4 by way of a transmission route including the server communication section 8 and the network 3 following the server communication section 8 as a signal informing the music reproduction terminal 4 that the transmission of the streaming musical data has been ended.

When the terminal communication section 7 employed in the music reproduction terminal 4 receives the transmission end notice signal from the music providing server 2, at the second step ST24 of the procedure shown in FIG. 16, the control section 6 employed in the music reproduction terminal 4 refers to the stored reproduction list L2 to recognize this time the second musical-data ID in the reproduction order and the server ID associated with the musical-data ID, transmitting a music-providing process start request signal to the music providing server 2 identified by the recognized server ID as a signal requesting the music providing server 2 to start a process of providing a piece of musical data identified by the recognized musical-data ID.

The music reproduction terminal 4 and the music providing server 2 repeatedly execute the steps ST24 to ST28 for each of the subsequent pieces of musical data in the same way as the procedure described above. In this way, the music reproduction terminal 4 is capable of sequentially reproducing a plurality of pieces of streaming musical data in accordance with the reproduction list L2 stored in the terminal storage section 14.

Next, the continuous streaming reproduction procedure MRT3 shown in FIG. 16 is explained by dividing the procedure into a processing procedure executed by the music providing server 2 and a processing procedure executed by the music reproduction terminal 4 as follows.

Figure 19:
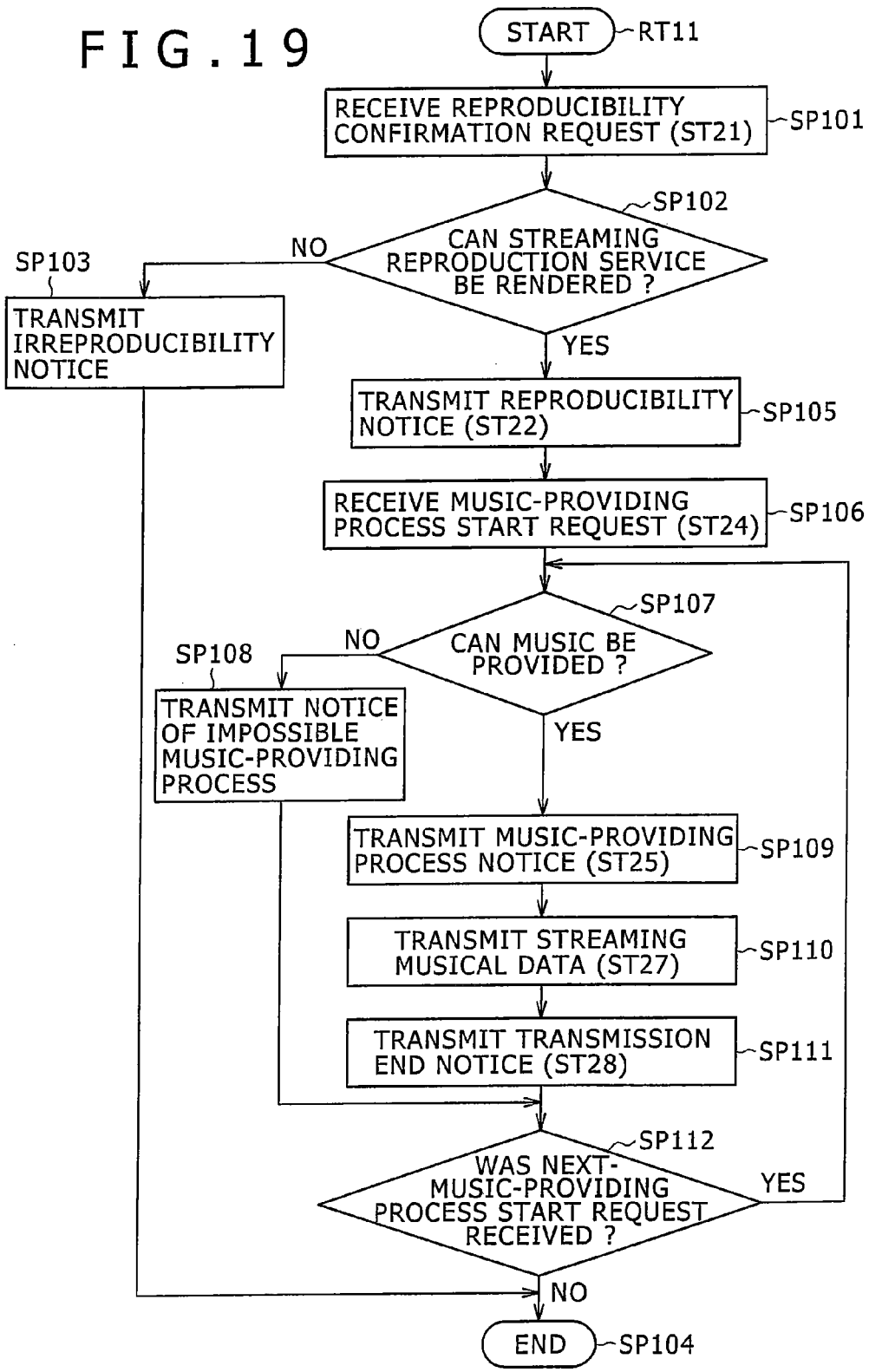
FIG. 19 shows a flowchart of a music-providing processing procedure.

First of all, a music providing processing procedure RT11 executed by the music providing server 2 is described by referring to a flowchart shown in FIG. 19 as follows.

When a reproducibility confirmation request signal is received from the music reproduction terminal 4 at the first step SP101, the flow of the procedure goes on to the next step SP102 at which the control section 9 employed in the music providing server 2 produces a result of determination as to whether or not a continuous streaming reproduction service can be rendered to the music reproduction terminal 4 identified by a terminal ID included in the received a reproducibility confirmation request signal. If the determination result produced at step SP102 is a denial, the flow of the procedure goes on to step SP103 at which the control section 9 employed in the music providing server 2 transmits an impossible-reproduction notice signal to the music reproduction terminal 4 by way of a transmission route including the server communication section 8 employed in the music providing server 2 and the network 3 following the server communication section 8 in order to inform the user of the music reproduction terminal 4 that a continuous streaming reproduction service is not able to be rendered to the user and then, at the next step SP104, the control section 9 ends the execution of the music providing processing procedure RT11. This is because the denial result indicates that a continuous streaming reproduction service is not able to be rendered to the music reproduction terminal 4 due to the fact that the user of the music reproduction terminal 4 is not a registered user subscribing to the service.

If the determination result produced at step SP102 is an affirmation, on the other hand, the flow of the procedure goes on to step SP105 at which the control section 9 employed in the music providing server 2 transmits a possible-reproduction notice signal to the music reproduction terminal 4 by way of a transmission route including the server communication section 8 and the network 3 following the server communication section 8 in order to inform the user that a continuous streaming reproduction service can be rendered to the user. This is because the affirmation result indicates that a continuous streaming reproduction service can be rendered to the music reproduction terminal 4 due to the fact that the user of the music reproduction terminal 4 is a registered user subscribing to the service.

Then, at the next step SP106, the server communication section 8 employed in the music providing server 2 receives a music-providing process start request signal from the music reproduction terminal 4. As described earlier, the music-providing process start request signal includes the musical-data ID of a piece of the musical data and the terminal ID of the music reproduction terminal 4. Subsequently, at the next step SP107, the control section 9 employed in the music providing server 2 produces a result of determination as to whether or not the piece of the musical data identified by the musical-data ID included in the music-providing process start request signal can be provided to the music reproduction terminal 4.

If the determination result produced at step SP107 is a denial indicating that the piece of the musical data identified by the musical-data ID included in the music-providing process start request signal is not able to be provided to the music reproduction terminal 4 typically due to the fact that the piece of data does not exist in the server storage section 10 employed in the music providing server 2, the flow of the procedure goes on to step SP108. At step SP108 the control section 9 employed in the music providing server 2 transmits an available music notice signal to the music reproduction terminal 4 by way of a transmission route including the server communication section 8 and the network 3 following the server communication section 8 in order to inform the music reproduction terminal 4 that the requested piece of data are not able to be provided to the music reproduction terminal 4. Then, the flow of the procedure goes on to step SP112. If the determination result produced at step SP107 is an affirmation indicating that the piece of the musical data identified by the musical-data ID included in the music-providing process start request signal can be provided to the music reproduction terminal 4 typically due to the fact that the piece of data exists in the server storage section 10 employed in the music providing server 2, on the other hand, the flow of the procedure goes on to step SP109. At step SP109, the control section 9 employed in the music providing server 2 transmits a music-providing process start notice signal to the music reproduction terminal 4 by way of a transmission route including the server communication section 8 and the network 3 following the server communication section 8 as a signal informing the music reproduction terminal 4 that the music providing server 2 has started the process of providing a piece of musical data identified by the musical-data ID included in the music-providing process start request signal to the music reproduction terminal 4.

Then, the flow of the procedure goes on to the next step SP110 at which the control section 9 employed in the music providing server 2 reads out musical data identified by the musical-data ID included in the music-providing process start request signal from the server storage section 10 and transmits the musical data read out from the server storage section 10 to the music reproduction terminal 4 identified by the terminal ID included in the music-providing process start request signal as streaming musical data.

Right after the transmission of the streaming musical data to the music reproduction terminal 4 is completed, the flow of the procedure goes on to the next step SP111 at which the control section 9 employed in the music providing server 2 transmits a transmission end notice signal to the music reproduction terminal 4 by way of a transmission route including the server communication section 8 and the network 3 following the server communication section 8 as a signal informing the music reproduction terminal 4 that the transmission of the streaming musical data has been ended.

Then, at the next step SP112, the control section 9 employed in the music providing server 2 produces a result of determination as to whether or not a music-providing process start request signal has been received from the music reproduction terminal 4 as a signal requesting the music providing server 2 to start a process of providing the next musical data to the music reproduction terminal 4. If the determination result produced at step SP112 is an affirmation indicating that a music-providing process start request signal has been received from the music reproduction terminal 4, the flow of the procedure goes back to step SP107. If the determination result produced at step SP112 is a denial indicating that no music-providing process start request signal has been received from the music reproduction terminal 4, on the other hand, the flow of the procedure goes on to the last step SP104 at which the control section 9 ends the execution of the music providing processing procedure RT11.

Figure 20:
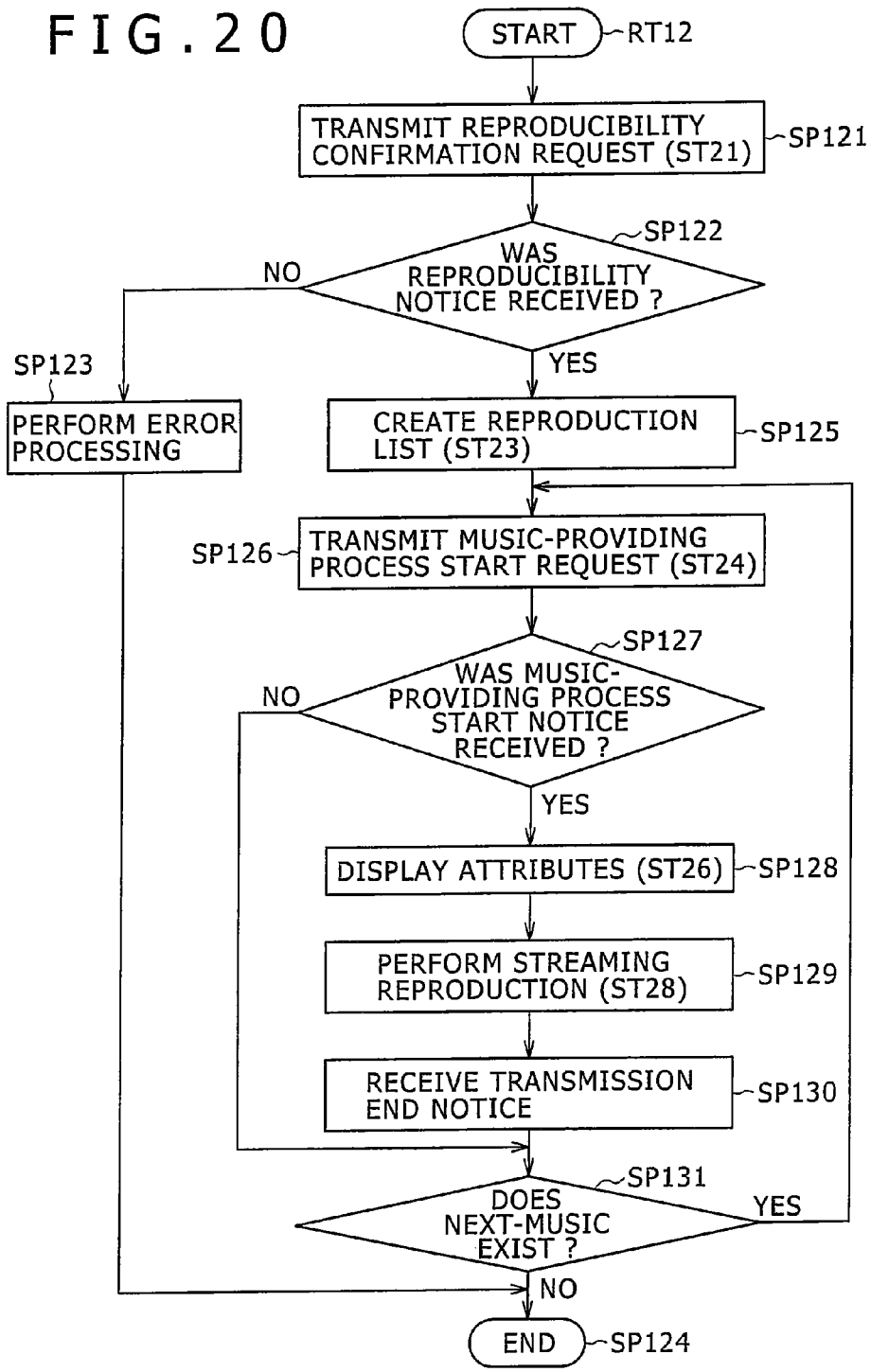
FIG. 20 shows a flowchart of a music reproduction processing procedure.

Next, a music reproduction processing procedure RT12 executed by the music reproduction terminal 4 is described by referring to a flowchart shown in FIG. 20 as follows.

When a continuous streaming reproduction operation is carried out on the operation section 5 employed in the music reproduction terminal 4 in order to make a request for a continuous streaming reproduction process to reproduce a plurality of pieces of musical data, at the first step SP121, the control section 6 employed in the music reproduction terminal 4 transmits a reproducibility confirmation request signal including the terminal ID of the music reproduction terminal 4 to the music providing server 2 by way of a transmission route including the terminal communication section 7 employed in the music reproduction terminal 4 and the network 3 following the terminal communication section 7.

Then, at the next step SP122, the control section 6 employed in the music reproduction terminal 4 produces a result of determination as to whether a reproducibility notice signal or an irreproducibility notice signal has been received from the music providing server 2. If the determination result produced at step SP122 is a denial indicating that an irreproducibility notice signal has been received from the music providing server 2, the flow of the procedure goes on to step SP123 at which the control section 6 carries out error processing including a process to inform the user that the request for a continuous streaming reproduction process to reproduce a plurality of pieces of musical data has been turned down. Then, at the next step SP124, the control section 6 ends the execution of the music reproduction processing procedure RT12.

If the determination result produced at step SP122 is an affirmation indicating that a reproducibility notice signal has been received from the music providing server 2, on the other hand, the flow of the procedure goes on to step SP125 at which the control section 6 employed in the music reproduction terminal 4 carries out a process to create a reproduction list L2 by executing one of the reproduction-list creation procedures RT8, RT9 and RT10 described before and stores the created reproduction list L2 in the terminal storage section 14.

Then, the flow of the procedure goes on to the next step SP126 at which the control section 6 employed in the music reproduction terminal 4 refers to the reproduction list L2 stored in the terminal storage section 14 to recognize for example the first musical-data ID in the reproduction order and the server ID associated with the musical-data ID, transmitting a music-providing process start request signal to the music providing server 2 identified by the recognized server ID as a signal requesting the music providing server 2 to start a process of providing a piece of musical data identified by the recognized musical-data ID to the music reproduction terminal 4.

Then, the flow of the procedure goes on to the next step SP127 at which the control section 6 employed in the music reproduction terminal 4 produces a result of determination as to whether a music-providing process start notice signal or an impossible music-providing process notice signal has been received from the music providing server 2. If the determination result produced at step SP127 is an affirmation indicating that a music-providing process start notice signal has been received from the music providing server 2, the flow of the procedure goes on to step SP128. If the determination result produced at step SP127 is a denial indicating that an impossible music-providing process notice signal has been received from the music providing server 2 in place of a music-providing process start notice signal, on the other hand, the flow of the procedure goes on to step SP131.

At step SP128, the control section 6 employed in the music reproduction terminal 4 displays information based on musical-data attributes included in the received music-providing process start notice signal on the display section 11 as information on the streaming musical data. The displayed information typically includes the title of the streaming musical data to be reproduced from now on in a streaming reproduction process and the names of artists associated with the streaming musical data.

Then, at the next step SP129, the control section 6 employed in the music reproduction terminal 4 carries out a streaming reproduction process by controlling the reproduction section 12 to sequentially reproduce the streaming musical data being received by the terminal communication section 7 from the music providing server 2.

Right after the terminal communication section 7 employed in the music reproduction terminal 4 receives a transmission end notice signal from the music providing server 2 at the next step SP130, the flow of the procedure goes on to the next step SP131 at which the control section 6 employed in the music reproduction terminal 4 refers to the reproduction list L2 stored in the terminal storage section 14 in order to produce a result of determination as to whether or not the musical data to be reproduced next in accordance with the reproduction order and a server ID associated with the next musical data exist on the reproduction list L2. If the determination result produced at step SP131 is an affirmation indicating that the next musical data and the server ID exist on the reproduction list L2, the flow of the procedure goes back to step SP126 at which the control section 6 employed in the music reproduction terminal 4 transmits a music-providing process start request signal to the music providing server 2 as a signal requesting the music providing server 2 to start a process of providing the musical data to be reproduced next in accordance with the reproduction order to the music reproduction terminal 4. If the determination result produced at step SP131 is a denial indicating that neither next musical data nor server ID exists on the reproduction list L2, on the other hand, the flow of the procedure goes on to the last step SP124 at which the control section 6 employed in the music reproduction terminal 4 ends the execution of the music reproduction processing procedure RT12.

As described above, the configuration of the music reproduction system 1 includes the music providing server 2 for providing musical data and the music reproduction terminal 4 for receiving musical data provided by the music providing server 2 by way of the network 3 and sequentially reproducing the musical data in streaming reproduction processes.

When the user carries out a continuous streaming reproduction operation on the operation section 5 employed in the music reproduction terminal 4 in order to make a request for a continuous streaming reproduction process to reproduce a plurality of pieces of musical data, the control section 6 employed in the music reproduction terminal 4 transmits at least the terminal ID of the music reproduction terminal 4 to the music providing server 2.

When the music providing server 2 receives the terminal ID of the music reproduction terminal 4 from the music reproduction terminal 4, the control section 9 employed in the music providing server 2 carries out a reproducible-music selection process to select pieces of musical data each reproducible by the music reproduction terminal 4 identified by the terminal ID in a streaming reproduction process from a plurality of pieces of musical data stored in the server storage section 10. Then, by arranging the musical-data IDs of the reproducible pieces of musical data selected in the reproducible-music selection process in a reproduction order, the control section 9 employed in the music providing server 2 or the control section 6 employed in the music reproduction terminal 4 creates a reproduction list L2 showing the order of reproduction of the selected pieces of musical data. The reproduction list L2 is then stored in the terminal storage section 14 employed in the music reproduction terminal 4.

Then, the control section 6 employed in the music reproduction terminal 4 requests the music providing server 2 to provide the music reproduction terminal 4 with pieces of musical data as streaming musical data in accordance with a reproduction order shown by the reproduction list L2 stored in the terminal storage section 14.

Thus, the music reproduction terminal 4 is capable of sequentially reproducing a plurality of pieces of streaming musical data being sequentially received from the music providing server 2 in accordance with the reproduction list L2 stored in the terminal storage section 14.

In accordance with the configuration described above, the music reproduction terminal 4 is capable of sequentially reproducing a plurality of pieces of streaming musical data being sequentially received from the music providing server 2 in accordance with the reproduction list L2 stored in the terminal storage section 14. As a result, it is possible to realize a music reproduction system 1 capable of reproducing musical data with a substantially high degree of efficiency without the need for the user to spend long time and much labor.

(5) Fourth Embodiment

A fourth embodiment implements the music reproduction system 1, the music providing server 2 and the music reproduction terminal 4, which have configurations identical with the configurations of their respective counterparts implemented by the first embodiment. The following description is focused on differences between the first and fourth embodiments.

In the case of the fourth embodiment, a recording medium used for recording a plurality of pieces of musical data is mounted on a recording-medium reproduction section 15 employed in the music reproduction terminal 4. Examples of the recording medium are a CD (Compact Disc), a semiconductor memory and an MD (Mini Disc, which is a trade mark). The recording-medium reproduction section 15 reads out musical data from the recording medium mounted thereon and supplies the musical data read out from the recording medium to the reproduction section 12, which then reproduces the musical data. In this way, the sound outputting section 13 is capable of outputting sounds of the musical data.

A CD is also used for storing typically CD recording music management information I1 including musical-data IDs each used for identifying a piece of musical data recorded on the CD and storage locations each associated with one of the musical-data IDs as shown in FIG. 21A. By the way, the musical-data ID of musical data recorded on a CD corresponds to the title of the musical data, the name of an artist associated with the musical data and a track number assigned to the musical data.

By the same token, a semiconductor memory is also used for storing typically semiconductor-memory recording music management information I2 including musical-data IDs each used for identifying a piece of musical data recorded on the semiconductor memory and storage locations each associated with one of the musical-data IDs as shown in FIG. 21B. In the same way, an MD is also used for storing typically MD recording music management information I3 including musical-data IDs each used for identifying a piece of musical data recorded on the MD and storage locations each associated with one of the musical-data IDs as shown in FIG. 21C.

In the case of this embodiment, typically, a hard-disk drive employed in the music reproduction terminal 4 to function as the terminal storage section 14 is used for storing a plurality of pieces of musical data in advance. Much like the recording mediums described above, the terminal storage section 14 is also used for storing typically terminal recording music management information I4 including musical-data IDs each used for identifying a piece of musical data recorded on the terminal storage section 14 and storage locations each associated with one of the musical-data IDs as shown in FIG. 21D.

Figure 22:
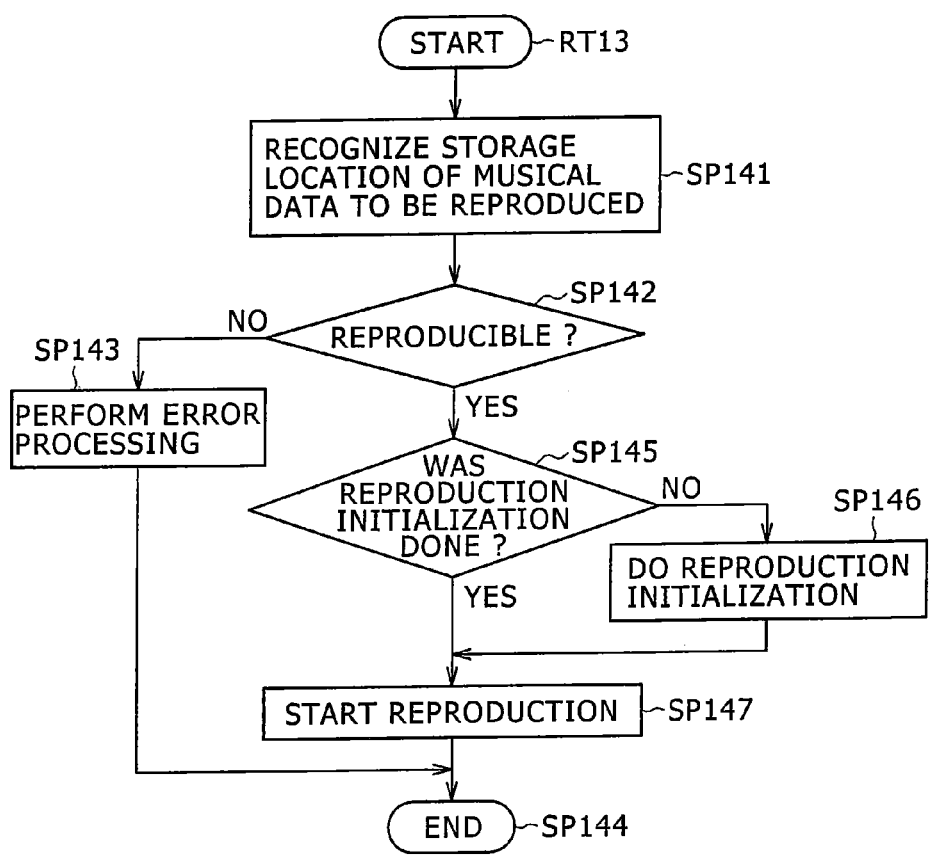
FIG. 22 shows a flowchart of a music reproduction processing procedure.

By referring to a flowchart shown in FIG. 22, the following description explains a reproduction processing procedure RT13 executed to carry out reproduction processing to reproduce musical data recorded on a CD. By the way, reproduction processing procedures for a semiconductor memory, an MD and the terminal storage section 14 are all but the same as the reproduction processing procedure RT13, making it unnecessary to explain the reproduction processing procedures for a semiconductor memory, an MD and the terminal storage section 14.

If a reproduction-requesting operation to make a request for reproduction of musical data recorded on the CD is carried out by entering the musical-data ID of the musical data to the operation section 5 employed in the music reproduction terminal 4, at the first step SP141, the control section 6 employed in the music reproduction terminal 4 refers to the CD recording music management information I1 to recognize a storage location associated with the musical-data ID entered to the operation section 5. In this case, the musical-data ID is typically a track number.

Then, the flow of the processing goes on to the next step SP142 at which the control section 6 employed in the music reproduction terminal 4 makes an access to the recognized storage location, which is a storage location on the CD, and produces a result of determination as to whether or not the musical data recorded at the storage location can be reproduced.

If the determination result produced at step SP142 is a denial indicating that the musical data recorded at the storage location cannot be reproduced, the flow of the procedure goes on to step SP143 at which the control section 6 employed in the music reproduction terminal 4 carries out error processing including a process to inform the user that the request for a reproduction process to reproduce the musical data has been turned down. Then, at the next step SP144, the control section 6 ends the execution of the music reproduction processing procedure RT13.

If the determination result produced at step SP142 is an affirmation indicating that the musical data recorded at the storage location can be reproduced, on the other hand, the flow of the procedure goes on to step SP145 at which the control section 6 employed in the music reproduction terminal 4 produces a result of determination as to whether or not an initialization process for reproduction of musical data from the CD has been done. If the determination result produced at step SP145 is a denial indicating that the initialization process has not been done, the flow of the procedure goes on to step SP146 at which the control section 6 employed in the music reproduction terminal 4 carries out the initialization process. Then, upon completion of the initialization process, the flow of the procedure goes on to the next step SP147 at which the control section 6 employed in the music reproduction terminal 4 carries out a process to reproduce the requested musical data from the CD. If the determination result produced at step SP145 is an affirmation indicating that the initialization process has been done, on the other hand, the flow of the procedure goes on directly to step SP147 at which the control section 6 employed in the music reproduction terminal 4 carries out a process to reproduce the requested musical data from the CD as described above.

Figure 23:
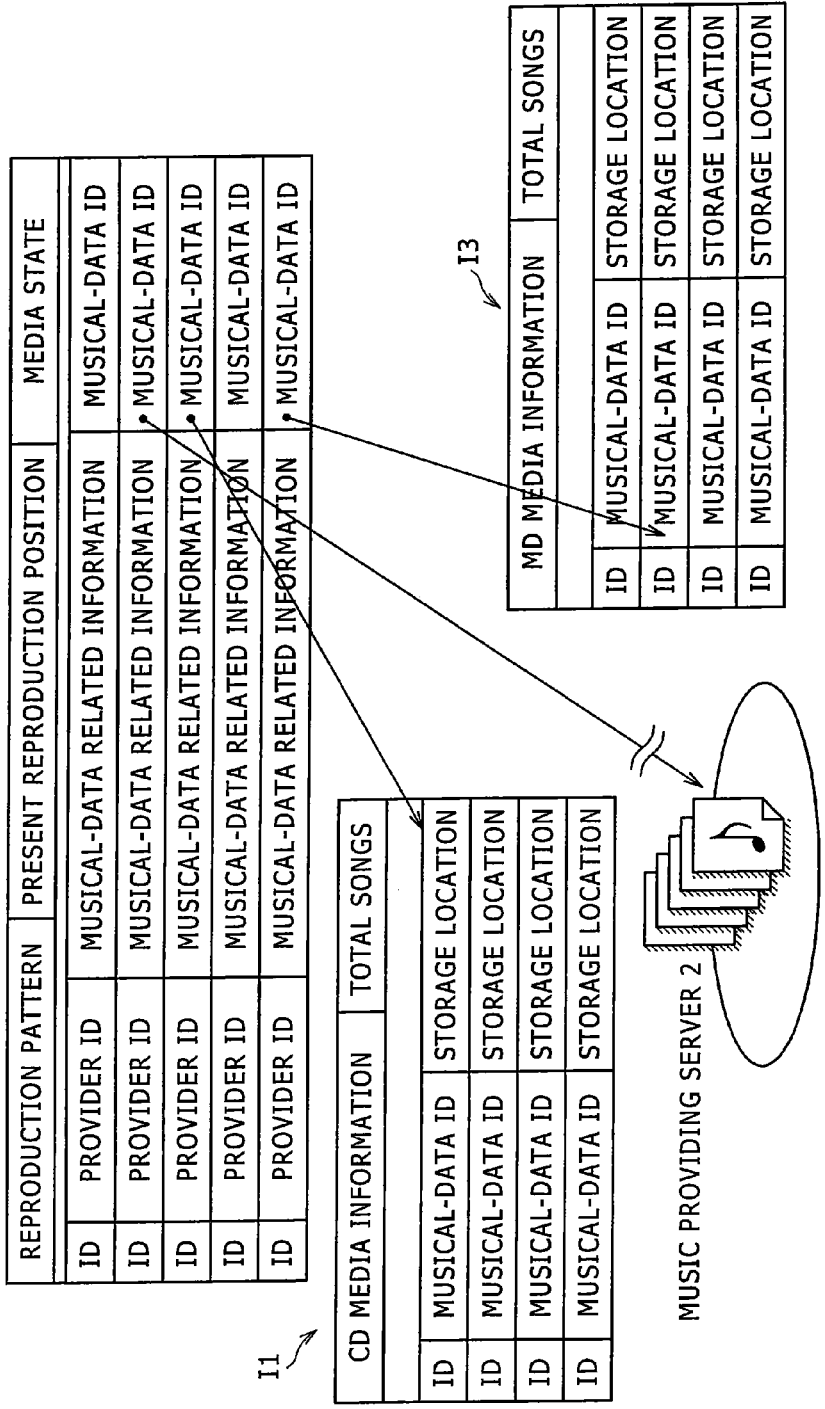
FIG. 23 is an explanatory rough diagram showing a reproduction list.

By the way, if a reproduction-list creation requesting operation to make a request for creation of a reproduction list is carried out, the control section 6 employed in the music reproduction terminal 4 creates a reproduction list L3 like one shown in FIG. 23 and stores the created reproduction list L3 in the terminal storage section 14.

The music reproduction terminal 4 creates a reproduction list L3 showing the musical-data ID of each piece of musical data stored on the CD, the semiconductor memory or the MD, musical-data related information relevant to the musical data and a provider ID identifying the provider of the musical data. The musical-data related information typically includes the title of the musical data and the name of an artist associated with the musical data. On the other hand, the provider ID of the musical data can be the ID of the CD, the semiconductor memory or the MD.

The control section 6 employed in the music reproduction terminal 4 may also recognize musical data stored in the music providing server 2 as musical data that can be reproduced by the music reproduction terminal 4. In this case, the reproduction list L3 shows the musical-data ID of such musical data, musical-data related information relevant to the musical data and a provider ID identifying the provider of the musical data. As described above, the musical-data related information typically includes the title of the musical data and the name of an artist associated with the musical data. In this case, however, the provider ID of the musical data is the music providing server 2.

Figure 24:
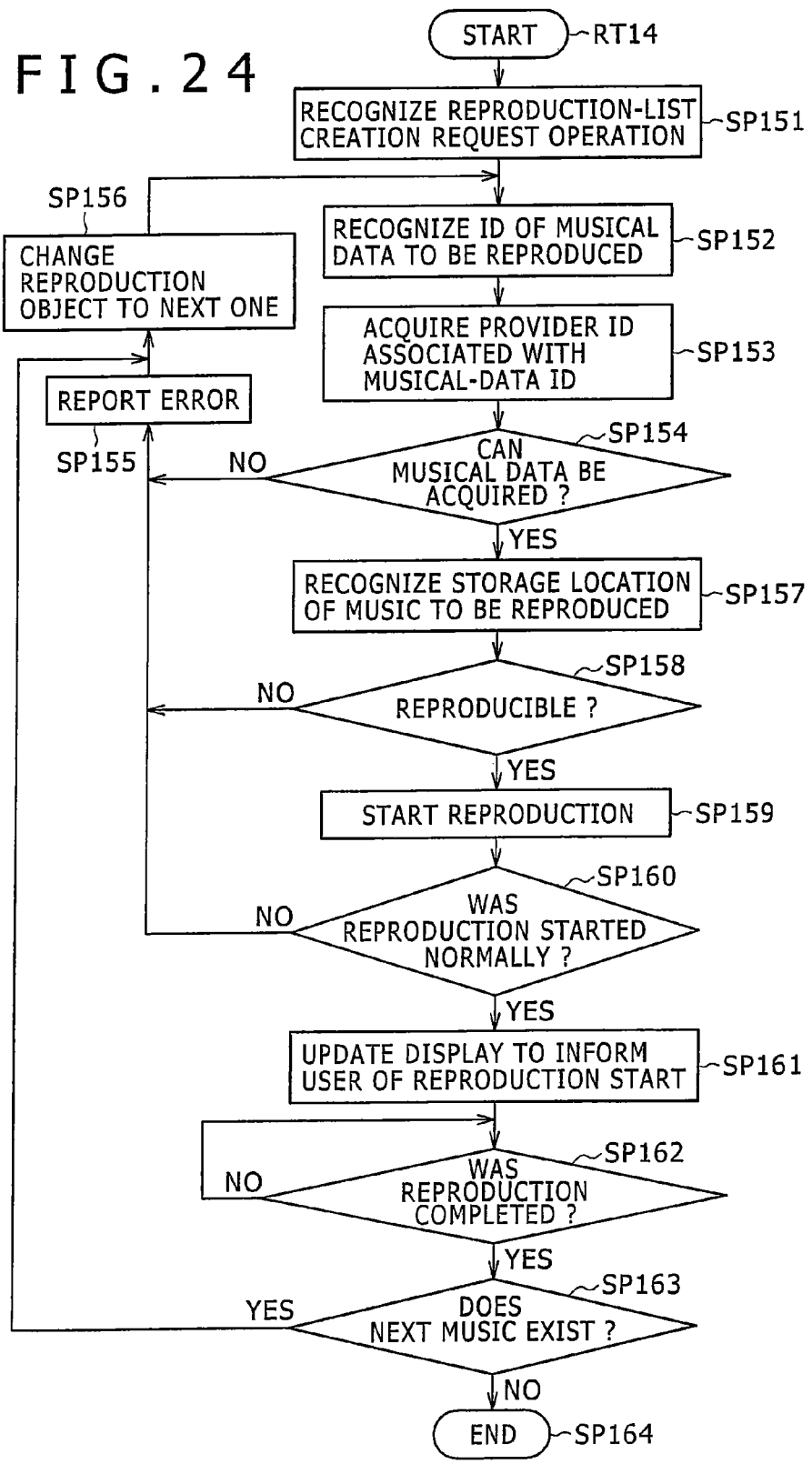
FIG. 24 shows a flowchart of a processing procedure for reproducing music in accordance with a reproduction list.

Next, by referring to a flowchart shown in FIG. 24, the following description explains a music reproduction processing procedure RT14 for reproducing musical data in accordance with the reproduction list L3.

At the first step SP151, the control section 6 employed in the music reproduction terminal 4 recognizes a music reproduction requesting operation carried out on the operation section 5 to make a request for reproduction of pieces of musical data in accordance with the reproduction list L3. Then, the flow of the procedure goes on to the next step SP152 at which the control section 6 employed in the music reproduction terminal 4 refers to the reproduction list L3 to recognize the musical-data ID of the musical data to be reproduced first in accordance with the reproduction order. Subsequently, the flow of the procedure goes on to the next step SP153 at which the control section 6 recognizes a provider ID associated with the musical-data ID. For example, the provider ID is the ID of a CD.

Then, the flow of the procedure goes on to the next step SP154 at which the control section 6 employed in the music reproduction terminal 4 produces a result of determination as to whether or not the musical data can be acquired from the CD serving as the musical-data provider identified by the recognized provider ID. If the determination result produced at step S154 is a negation indicating that the musical data is not able to be acquired from the CD serving as the musical-data provider due to, for example, the fact that the CD has not been mounted on or connected to the recording-medium reproduction section 15, the flow of the procedure goes on to step SP155 at which the control section 6 employed in the music reproduction terminal 4 carries out error processing including a process to inform the user that the musical data cannot be acquired from the CD. Then, the flow of the procedure goes on to the next step SP156.

If the determination result produced at step S154 is an affirmation indicating that the musical data can be acquired from the CD already been mounted on or connected to the recording-medium reproduction section 15, on the other hand, the flow of the procedure goes on to step SP157 at which the control section 6 employed in the music reproduction terminal 4 carries out a process as follows.

At step SP157, the control section 6 employed in the music reproduction terminal 4 refers to music management information of the musical-data provider identified by the provider ID recognized at step SP153 to recognize the storage location associated with the musical-data ID recognized at step SP152. In this case, the music management information of the musical-data provider is the CD recording music management information I1.

Then, the flow of the procedure goes on to the next step SP158 at which the control section 6 employed in the music reproduction terminal 4 makes an access to the storage location recognized at step S157 as a storage location on the CD and produces a result of determination as to whether or not the musical data can be reproduced.

If the determination result produced at step S158 is a negation indicating that the musical data is not able to be reproduced, the flow of the procedure goes on to step SP155 at which the control section 6 employed in the music reproduction terminal 4 carries out error processing including a process to inform the user that the musical data is not able to be reproduced. If the determination result produced at step S158 is an affirmation indicating that the musical data can be reproduced, on the other hand, the flow of the procedure goes on to step SP159 at which the control section 6 employed in the music reproduction terminal 4 reads out the musical data from the musical-data provider and starts reproducing the musical data.

Then, the flow of the procedure goes on to the next step SP160 at which the control section 6 employed in the music reproduction terminal 4 produces a result of determination as to whether or not the reproduction of the musical data can be started normally. If the determination result produced at step S160 is a negation indicating that the reproduction of the musical data is not able to be started normally, the flow of the procedure goes on to step SP155 at which the control section 6 employed in the music reproduction terminal 4 carries out error processing. If the determination result produced at step S160 is an affirmation indicating that the reproduction of the musical data can be started normally, on the other hand, the flow of the procedure goes on to step SP161 at which the control section 6 fetches musical-data related information associated with the musical-data ID of the musical data from the reproduction list L3 and displays data based on the musical-data related information on the display section 11 in order to inform the user that the reproduction of the musical data has been started. The displayed information includes the title of the musical data and the name of an artist associated with the musical data.

Then, the flow of the procedure goes on to the next step SP162 at which the control section 6 employed in the music reproduction terminal 4 produces a result of determination as to whether or not the reproduction of the musical data has been completed. If the determination result produced at step S162 is a negation indicating that the reproduction of the musical data has not been completed yet, the flow of the procedure goes back to step SP162 to repeat the process of the same step. If the determination result produced at step S162 is an affirmation indicating that the reproduction of the musical data has been completed, on the other hand, the flow of the procedure goes on to step SP163 at which the control section 6 produces a result of determination as to whether or not musical-data related information and a musical-data ID still remain on the reproduction list L3 to be processed next. If the determination result produced at step S163 is an affirmation indicating that musical-data related information and a musical-data ID still remain on the reproduction list L3 to be processed next, the flow of the procedure goes on to step SP156 at which the control section 6 employed in the music reproduction terminal 4 refers to the next object of reproduction on the reproduction list L3. Then, the flow of the procedure goes back to step SP152. If the determination result produced at step S163 is a negation indicating that neither musical-data related information nor musical-data ID remains on the reproduction list L3 to be processed next, on the other hand, the flow of the procedure goes on to the last step SP164 at which the control section 6 employed in the music reproduction terminal 4 ends the execution of the musical-data reproduction processing procedure RT14.

As described above, by execution of the music reproduction processing procedure RT14 for reproducing musical data in accordance with a reproduction list, the music reproduction terminal 4 is capable of sequentially reproducing pieces of musical data in accordance with the reproduction list L3. As described above, the reproduced pieces of musical data are pieces of musical data downloaded from the music providing server 2, pieces of musical data recorded on a CD, an MD or a semiconductor memory, or pieces of musical data stored in advance in the terminal storage section 14.

Figure 25:
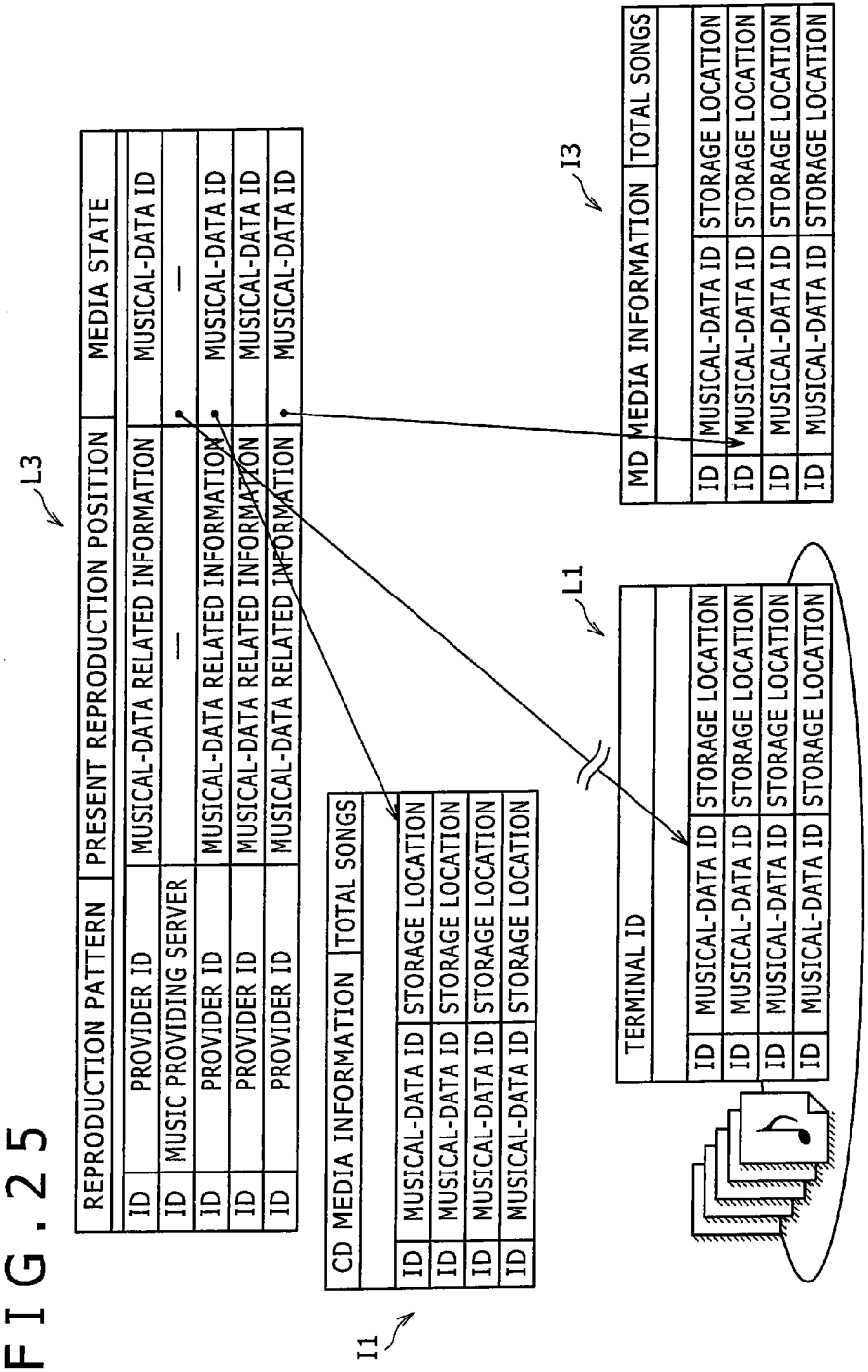
FIG. 25 is an explanatory rough diagram showing a reproduction list having a different format.

By the way, in the case of this embodiment, the control section 6 employed in the music reproduction terminal 4 creates a reproduction list L3 showing a musical-data ID of each specific piece of musical data, information related to the specific piece of musical data and the ID of a provider providing the specific piece of musical data. The specific piece of musical data is a piece of data selected among pieces of musical data stored in the provider, which is the music providing server 2, as a piece of musical data that can be reproduced by the music reproduction terminal 4. However, the scope of the present invention is not limited to this embodiment. For example, only the music providing server 2 is shown as the provider ID as indicated on the second row of the reproduction list L3 shown in FIG. 25. In this case, the music providing server 2 holds a reproduction list L1 as is the case with the first embodiment described earlier. With the reproduction list L3 held in the music reproduction terminal 4 and the reproduction list L1 held in the music providing server 2, the music reproduction terminal 4 employed in the music reproduction terminal 4 is capable of reproducing streaming musical data corresponding to, for example, the second line of the reproduction list L3 in accordance with the reproduction list L1 when the second row is recognized as an object of reproduction by carrying out the processing of the steps ST4 to ST7 of the procedure shown in FIG. 7.

(6) Other Embodiments

In the first to fourth embodiments described above, musical data is reproduced as a piece of content. It is to be noted, however, that the scope of the present invention is not limited to these embodiments. For example, the present invention can be applied to other contents such as a movie or a TV program.

In addition, in the first to fourth embodiments described above, the control section 9 employed in the music providing server 2 and the control section 6 employed in the music reproduction terminal 4 execute the continuous streaming reproduction processing procedures MRT1 to MRT3 and other procedures in accordance with programs installed in the control section 9 and the control section 6 respectively. However, the scope of the present invention is not limited to these embodiments. For example, the music providing server 2 and the music reproduction terminal 4 are capable of executing the continuous streaming reproduction processing procedures MRT1 to MRT3 and other procedures by hardware, which is circuits provided in the music providing server 2 and the music reproduction terminal 4 respectively as circuits for executing the continuous streaming reproduction processing procedures MRT1 to MRT3 and other procedures. If the control section 9 employed in the music providing server 2 and the control section 6 employed in the music reproduction terminal 4 execute the continuous streaming reproduction processing procedures MRT1 to MRT3 and other procedures in accordance with preinstalled programs, the programs can be installed from a recording medium for storing the programs. An example of the recording medium is a CD.

In addition, in the first to fourth embodiments described above, the control section 9 employed in the music providing server 2 selects only pieces of musical data to be provided to the music reproduction terminal 4 in order to exclude musical data having a format incompatible with the reproduction characteristic of the control section 6 employed in the music reproduction terminal 4. However, the scope of the present invention is not limited to these embodiments. For example, the music providing server 2 may also change the format of musical data into a format compatible with the control section 6 before providing the musical data to the music reproduction terminal 4. To put it concretely, let us assume for example that the music reproduction terminal 4 is compatible with the ATRAC format only. In this case, if the musical data held in the music providing server 2 has the MP3 format, a converter employed in the music providing server 2 converts the musical data having the MP3 format into musical data having the ATRAC format before transmitting the musical data to the music reproduction terminal 4 by adoption of a streaming method. In this case, the terminal ID transmitted by the music reproduction terminal 4 to the music providing server 2 includes information on the format compatible with the music reproduction terminal 4.

It is to be noted that, instead of including information on the format compatible with the music reproduction terminal 4 in the terminal ID transmitted by the music reproduction terminal 4 to the music providing server 2, the music providing server 2 may read out a musical file stored in the music reproduction terminal 4 and recognize the format of the file as a format compatible with the music reproduction terminal 4.

By the way, in the configuration shown in FIG. 1, the content-providing apparatus 101 corresponds to the music providing server 2, the content reproduction apparatus 102 corresponds to the music reproduction terminal 4, the terminal-ID sender section 103 corresponds to the control section 6 employed in the music reproduction terminal 4 as a controller for executing the continuous streaming reproduction processing procedures MRT1 to MRT3, the content storage section 104 corresponds to the server storage section 10, the content selection section 105, the reproduction-list creation section 106 and the content providing section 107 correspond to the control section 9 employed in the music providing server 2 as a controller for executing the continuous streaming reproduction processing procedures MRT1 to MRT3 whereas the content reproduction section 108 corresponds to the reproduction section 12. In the configuration shown in FIG. 2, the content-providing apparatus 111 corresponds to the music providing server 2, the content reproduction apparatus 112 corresponds to the music reproduction terminal 4, the terminal-ID sender section 113, the reproduction-list creation section 116 and the content requesting section 117 correspond to the control section 6 employed in the music reproduction terminal 4 as a controller for executing the continuous streaming reproduction processing procedures MRT1 to MRT3, the content storage section 114 corresponds to the server storage section 10, the content selection section 115 and the content providing section 118 correspond to the control section 9 employed in the music providing server 2 as a controller for executing the continuous streaming reproduction processing procedures MRT1 to MRT3 whereas the content reproduction section 119 corresponds to the reproduction section 12.

For example, the present invention can be applied to typically a music reproduction system including a music providing server for providing musical data and a music reproduction terminal for acquiring musical data provided by the music providing server by way of a network and, at the same time, reproducing the acquired musical data.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. A content reproduction apparatus, comprising:
a communication unit configured to communicate with a content-providing apparatus;
a reproducing unit configured to reproduce content data; and
a controller configured
to transmit a request to the content-providing apparatus, the request indicating whether a data streaming reproduction service is available and specifying an artist name,
to receive and reproduce a first one of an order of content data which is ordered by the content-providing apparatus based on the request, and
to receive, after a determination that a second one of the order of content data exists, an attribute of the second one of the order of content data, the attribute including an artist name of the second one of the order of content data, the artist name of the second one of the order of content data being different from the artist name specified by the request.

2. The content reproduction apparatus according to claim 1, further comprising:
a display, wherein the controller is further configured to display the attribute of the second one of the order of content data.

3. The content reproduction apparatus according to claim 1, wherein the controller is further configured to receive and reproduce the second one of the order of content data after the determination.

4. A method implemented by a content reproduction apparatus, the method comprising:
transmitting a request to a content-providing apparatus, the request indicating whether a data streaming reproduction service is available and specifying an artist name;
receiving a first one of an order of content data which is ordered by the content-providing apparatus based on the request;
reproducing the first one of the order of content data; and
receiving, after a determination that a second one of the order of content data exists, an attribute of the second one of the order of content data, the attribute including an artist name of the second one of the order of content data, the artist name of the second one of the order of content data being different from the artist name specified by the request.

5. The method according to claim 4, further comprising:
displaying the attribute of the second one of the order of content data.

6. The method according to claim 4, further comprising:
receiving and reproducing the second one of the order of content data after the determination.

7. A computer-readable storage medium encoded with computer executable instructions, wherein the instructions, when executed by a processing unit, cause the processing unit to perform a method comprising:
transmitting a request to a content-providing apparatus, the request indicating whether a data streaming reproduction service is available and specifying an artist name;
receiving a first one of an order of content data which is ordered by the content-providing apparatus based on the request;
reproducing the first one of the order of content data; and
receiving, after a determination that a second one of the order of content data exists, an attribute of the second one of the order of content data, the attribute including an artist name of the second one of the order of content data, the artist name of the second one of the order of content data being different from the artist name specified by the request.

8. The computer-readable storage medium according to claim 7, the method further comprising:
displaying the attribute of the second one of the order of content data.

9. The computer-readable storage medium according to claim 7, the method further comprising:
receiving and reproducing the second one of the order of content data after the determination.

10. A content reproduction apparatus, comprising:
a communication unit configured to communicate with a content-providing apparatus;
a reproducing unit configured to reproduce content data; and
a controller configured
to transmit a request to the content-providing apparatus, the request including an apparatus identifier that identifies the content reproduction apparatus and specifying an artist name,
to receive and reproduce a first one of an order of content data which is ordered by the content-providing apparatus based on the request, and
to receive, after a determination that a second one of the order of content data exists, an attribute of the second one of the order of content data, the attribute including an artist name of the second one of the order of content data, the artist name of the second one of the order of content data being different from the artist name specified by the request.

11. The content reproduction apparatus according to claim 10, further comprising:
a display, wherein the controller is further configured to display the attribute of the second one of the order of content data.

12. The content reproduction apparatus according to claim 10, wherein the controller is further configured to receive and reproduce the second one of the order of content data after the determination.

13. A method implemented by a content reproduction apparatus, the method comprising:
transmitting a request to a content-providing apparatus, the request including an apparatus identifier that identifies the content reproduction apparatus and specifying an artist name;
receiving a first one of an order of content data which is ordered by the content-providing apparatus based on the request;
reproducing the first one of the order of content data; and
receiving, after a determination that a second one of the order of content data exists, an attribute of the second one of the order of content data, the attribute including an artist name of the second one of the order of content data, the artist name of the second one of the order of content data being different from the artist name specified by the request.

14. The method according to claim 13, further comprising:
displaying the attribute of the second one of the order of content data.

15. The method according to claim 13, further comprising:
receiving and reproducing the second one of the order of content data after the determination.

16. A computer-readable storage medium encoded with computer executable instructions, wherein the instructions, when executed by a processing unit, cause the processing unit to perform a method comprising:
transmitting a request to a content-providing apparatus, the request including an apparatus identifier that identifies a content reproduction apparatus including the processing unit, the request specifying an artist name;
receiving a first one of an order of content data which is ordered by the content-providing apparatus based on the request;
reproducing the first one of the order of content data; and
receiving, after a determination that a second one of the order of content data exists, an attribute of the second one of the order of content data, the attribute including an artist name of the second one of the order of content data, the artist name of the second one of the order of content data being different from the artist name specified by the request.

17. The computer-readable storage medium according to claim 16, the method further comprising:
displaying the attribute of the second one of the order of content data.

18. The computer-readable storage medium according to claim 16, the method further comprising:
receiving and reproducing the second one of the order of content data after the determination.

19. A content reproduction apparatus, comprising:
a communication unit configured to communicate with a content-providing apparatus;
a reproducing unit configured to reproduce content data; and
a controller configured
to transmit a first request to the content-providing apparatus to decide an order of content data,
to transmit, upon receiving a reproducibility notice signal from the content-providing apparatus as a response to the first request, a second request to start a transmission of a continuous streaming reproduction based on the order of content data, at least one of the first request and the second request specifying an artist name,
to receive an attribute of a first one of the order of content data in a response to the second request,
to receive and reproduce the first one of the order of content data, and
to receive, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

20. The content reproduction apparatus according to claim 19, further comprising:
a display, wherein the controller is further configured to display the attribute of the second one of the order of content data.

21. The content reproduction apparatus according to claim 19, wherein the controller is further configured to receive and reproduce the second one of the order of content data after the determination.

22. A method implemented by a content reproduction apparatus, the method comprising:
transmitting a first request to a content-providing apparatus to decide an order of content data;
transmitting, upon receiving a reproducibility notice signal from the content-providing apparatus as a response to the first request, a second request to start a transmission of a continuous streaming reproduction based on the order of content data, at least one of the first request and the second request specifying an artist name;
receiving an attribute of a first one of the order of content data in a response to the second request;
receiving the first one of the order of content data;
reproducing the first one of the order of content data; and receiving, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

23. The method according to claim 22, further comprising: displaying the attribute of the second one of the order of content data.

24. The method according to claim 22, further comprising: receiving and reproducing the second one of the order of content data after the determination.

25. A computer-readable storage medium encoded with computer executable instructions, wherein the instructions, when executed by a processing unit, cause the processing unit to perform a method comprising:
   transmitting a first request to a content-providing apparatus to decide an order of content data;
   transmitting, upon receiving a reproducibility notice signal from the content-providing apparatus as a response to the first request, a second request to start a transmission of a continuous streaming reproduction based on the order of content data, at least one of the first request and the second request specifying an artist name;
   receiving an attribute of a first one of the order of content data in a response to the second request;
   receiving the first one of the order of content data;
   reproducing the first one of the order of content data; and
   receiving, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

26. The computer-readable storage medium according to claim 25, the method further comprising:
   displaying the attribute of the second one of the order of content data.

27. The computer-readable storage medium according to claim 25, the method further comprising:
   receiving and reproducing the second one of the order of content data after the determination.

28. A content reproduction apparatus, comprising:
   a communication unit configured to communicate with a content-providing apparatus;
   a reproducing unit configured to reproduce content data; and
   a controller configured
      to transmit a first request to the content-providing apparatus to confirm a content reproducibility,
      to transmit, upon receiving a reproducibility notice signal from the content-providing apparatus as a response to the first request, a second request to start a transmission of a continuous streaming reproduction, at least one of the first request and the second request specifying an artist name,
      to receive an attribute of a first one of an order of content data in a response to the second request,
      to receive and reproduce the first one of the order of content data in the continuous streaming reproduction, and
      to receive, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

29. The content reproduction apparatus according to claim 28, further comprising:
   a display, wherein the controller is further configured to display the attribute of the second one of the order of content data.

30. The content reproduction apparatus according to claim 28, wherein the controller is further configured to receive and reproduce the second one of the order of content data after the determination.

31. The content reproduction apparatus according to claim 28, wherein the controller is further configured to create a reproduction list which determines the order of content data before a transmission of the second request.

32. A method implemented by a content reproduction apparatus, the method comprising:
   transmitting a first request to a content-providing apparatus to confirm a content reproducibility;
   transmitting, upon receiving a reproducibility notice signal from the content-providing apparatus as a response to the first request, a second request to start a transmission of a continuous streaming reproduction, at least one of the first request and the second request specifying an artist name;
   receiving an attribute of a first one of an order of content data in a response to the second request;
   receiving the first one of the order of content data in the continuous streaming reproduction;
   reproducing the first one of the order of content data in the continuous streaming reproduction; and
   receiving, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

33. The method according to claim 32, further comprising: displaying the attribute of the second one of the order of content data.

34. The method according to claim 32, further comprising: receiving and reproducing the second one of the order of content data after the determination.

35. The method according to claim 32, further comprising: creating a reproduction list which determines the order of content data before the transmitting the second request.

36. A computer-readable storage medium encoded with computer executable instructions, wherein the instructions, when executed by a processing unit, cause the processing unit to perform a method comprising:
   transmitting a first request to a content-providing apparatus to confirm a content reproducibility;
   transmitting, upon receiving a reproducibility notice signal from the content-providing apparatus as a response to the first request, a second request to start a transmission of a continuous streaming reproduction, at least one of the first request and the second request specifying an artist name;
   receiving an attribute of a first one of an order of content data in a response to the second request;

receiving the first one of the order of content data in the continuous streaming reproduction;

reproducing the first one of the order of content data in the continuous streaming reproduction; and receiving, after a determination that a second one of the order of content data exists, an attribute of the second one of the order of content data, the attribute of the second one of the order of content data including an artist name of the second one of the order of content data, the artist name of the second one of the order of content data being different from the artist name specified by the at least one of the first request and the second request.

37. The computer-readable storage medium according to claim 36, the method further comprising:

displaying the attribute of the second one of the order of content data.

38. The computer-readable storage medium according to claim 36, the method further comprising:

receiving and reproducing the second one of the order of content data after the determination.

39. The computer-readable storage medium according to claim 36, the method further comprising:

creating a reproduction list which determines the order of content data before the transmitting the second request.

40. The content reproduction apparatus according to claim 1, wherein the controller is further configured to receive the second one of the order of content data, which is based on the specified artist name.

41. The content reproduction apparatus according to claim 1, wherein the communication unit transmits data specifying one of the order of content data and receives the specified one of the order of content data, and the controller reproduces the specified one of the order of content data.

* * * * *